(12) United States Patent
Macaro et al.

(10) Patent No.: US 9,672,193 B2
(45) Date of Patent: Jun. 6, 2017

(54) COMPACT REPRESENTATION OF MULTIVARIATE POSTERIOR PROBABILITY DISTRIBUTION FROM SIMULATED SAMPLES

(71) Applicant: SAS Institute Inc., Cary, NC (US)

(72) Inventors: Christian Macaro, Raleigh, NC (US); Jan Chvosta, Raleigh, NC (US); Mark Roland Little, Cary, NC (US)

(73) Assignee: SAS Institute Inc., Cary, NC (US)

( * ) Notice: Subject to any disclaimer, the term of this patent is extended or adjusted under 35 U.S.C. 154(b) by 418 days.

(21) Appl. No.: 14/217,707

(22) Filed: Mar. 18, 2014

(65) Prior Publication Data

US 2014/0279819 A1 Sep. 18, 2014

Related U.S. Application Data

(60) Provisional application No. 61/794,242, filed on Mar. 15, 2013, provisional application No. 61/798,245, filed on Mar. 15, 2013.

(51) Int. Cl.
| | |
|---|---|
| *G06F 9/44* | (2006.01) |
| *G06N 7/02* | (2006.01) |
| *G06N 7/06* | (2006.01) |
| *G06F 17/18* | (2006.01) |
| *G06N 7/00* | (2006.01) |

(52) U.S. Cl.
CPC ............ *G06F 17/18* (2013.01); *G06N 7/005* (2013.01)

(58) Field of Classification Search
None
See application file for complete search history.

(56) References Cited

U.S. PATENT DOCUMENTS

| | | | |
|---|---|---|---|
| 6,192,312 B1* | 2/2001 | Hummelsheim | G01C 21/30 701/118 |
| 2006/0027744 A1 | 2/2006 | Stults et al. | |
| 2008/0071692 A1 | 3/2008 | Jain | |
| 2008/0231509 A1 | 9/2008 | Iwamoto et al. | |

(Continued)

OTHER PUBLICATIONS

Raftery et al., "One Long Run with Diagnostics: Implementation Strategies for Markov Chain Monte Carlo", Statistical Science, (1992), 5 pages.

(Continued)

*Primary Examiner* — Luis Sitiriche

(57) ABSTRACT

Various embodiments are directed to techniques for selecting a subset of a set of simulated samples. A computer-program product including instructions to cause a computing device to order a plurality of UPDFs by UPDF value, wherein the plurality of UPDFs is associated with a chain of draws of a set of simulated samples, wherein each draw comprises multiple parameters and the UPDF values map to parameter values of the parameters; select a subset of the plurality of UPDFs based on the subset of the plurality of UPDFs having UPDF values within a range corresponding to a range of parameter values to include in a subset of the set of simulated samples; and transmit an indication of a draw comprising parameters having parameter values to include in the subset of the set of simulated samples, wherein the indication identifies the draw by associated UPDF. Other embodiments are described and claimed.

28 Claims, 14 Drawing Sheets

(56) References Cited

U.S. PATENT DOCUMENTS

| | | | |
|---|---|---|---|
| 2009/0287623 A1* | 11/2009 | Martin | G06N 7/005 706/13 |
| 2011/0208676 A1 | 8/2011 | Jonas et al. | |
| 2012/0246189 A1 | 9/2012 | Castellanos et al. | |
| 2014/0072094 A1 | 3/2014 | Sierwald et al. | |
| 2014/0358831 A1 | 12/2014 | Adams et al. | |
| 2015/0095415 A1 | 4/2015 | White et al. | |

OTHER PUBLICATIONS

Raftery et al., "The Number of Iterations, Convergence Diagnostics, and Generic Metropolis Algorithms", Chapman & Hall, (1995), 15 pages.

Heidelberger et al., "Simulation Run Length Control in the Presence of an Initial Transient", Operations Research, vol. 31, No. 6, pp. 1109-1144, 1983.

Heidelberger et al., "A Spectral Method for Confidence Interval Generation and Run Length Control in Simulations", Simulation Modeling and Statistical Computing, Communications of the ACM, vol. 24, No. 4, Apr. 1981, 13 pages.

Geweke, J. (1992), "Evaluating the Accuracy of Sampling-Based Approaches to Calculating Posterior Moments," Oxford University Press, vol. 4, 1992, 25 pages.

Venables, W. N., "An Introduction to R", <http://crans-project.org/doc/manuals/r-release/R-intro.html>, version 3.1.1 (Jul. 10, 2014), 1990 pp. 1-45.

Venables, W. N., "An Introduction to R", <http://crans-project.org/doc/manuals/r-release/R-intro.html>, version 3.1.1 (Jul. 10, 2014-07-10), 1990 pp. 46-90.

Venables, W. N., "An Introduction to R", <http://crans-project.org/doc/manuals/r-release/R-intro.html>, version 3.1.1 (Jul. 10, 2014), 1990 pp. 91-124.

"Simulation of dependent random variables using copulas", The MathWorks, <http://www.mathworks.com/products/demosistatistics/copulademo.html>, 13 page, Unknown date, Unknown author.

"Distributions, Simulation, and Excel Functions", <http://www.sba.oakland.edu/faculty/isken/hcm540/Session03_DMUncertainty/DistributionsSimulationExcelFunctions.pdf>, 4 pages, Jun. 11, 2013, unknown author.

Wikipedia, "Monte Carlo Method", <http://en.wikipedia.org/wiki/Monte_Carlo_method>, 10 pages, date unknown, author unknown.

"Data Analysis & Simulation", MathWave Technologies, <http://mathwave.com/blog/category/distributions/>, Dec. 2, 2013, 6 pages.

Man, Nguyen, V.M., "Mathematical Modeling and Simulation", Sep. 6, 2010, 70 pages (pp. 1-35).

Man, Nguyen, V.M., "Mathematical Modeling and Simulation", Sep. 6, 2010, 70 pages (pp. 36-70).

"Simulation Tutorial—Models", 2014 Frontline Systems, Inc., <http://www.solver.com/simulation-models>, 2 pages, (Author unknown).

"The mathematics of safe machine intelligence", Machine Intelligence Research Institute, <http://intelligence.org/research/?gclid=CMGlkJGzpb4CFUuXOgodKj4ABw>, 4 pages, (unknown date, unknown author).

Reber et al., "Statistics Applets", <http://www.bbn-school.org/us/math/ap_stats/applets/applets.html>, May 2000, 4 pages.

Ing et al., "Mathematical and Computational Modeling and Simulation", < http://www.informatik.uni-hamburg.de/TIS/downloads/Vorlesung_CMS_2005_3.pdf>, 2005, 285 pages (pp. 1-45).

Ing et al., "Mathematical and Computational Modeling and Simulation", < http://www.informatik.uni-hamburg.de/TIS/downloads/Vorlesung_CMS_2005_3.pdf>, 2005, 285 pages (pp. 46-86 ).

Ing et al., "Mathematical and Computational Modeling and Simulation", < http://www.informatik.uni-hamburg.de/TIS/downloads/Vorlesung_CMS_2005_3.pdf>, 2005, 285 pages (pp. 87-135).

Ing et al., "Mathematical and Computational Modeling and Simulation", < http://www.informatik.uni-hamburg.de/TIS/downloads/Vorlesung_CMS_2005_3.pdf>, 2005, 285 pages (pp. 136-192).

Ing et al., "Mathematical and Computational Modeling and Simulation", < http://www.informatik.uni-hamburg.de/TIS/downloads/Vorlesung_CMS_2005_3.pdf>, 2005, 285 pages (pp. 193-240).

Ing et al., "Mathematical and Computational Modeling and Simulation", < http://www.informatik.uni-hamburg.de/TIS/downloads/Vorlesung_CMS_2005_3.pdf>, 2005, 285 pages (pp. 241-285).

Office Action received for U.S. Appl. No. 14/217,858, mailed Dec. 1, 2016, 22 pages.

* cited by examiner

COMPACT REPRESENTATION OF MULTIVARIATE POSTERIOR PROBABILITY DISTRIBUTION FROM SIMULATED SAMPLES

CROSS-REFERENCE TO RELATED APPLICATIONS

This application claims the benefit of priority under 35 U.S.C. §119(e) to U.S. Provisional Application Ser. No. 61/794,242 entitled "COMPACT REPRESENTATION OF POSTERIOR SAMPLES WITH ISO-PROBABILITY SURFACE," filed Mar. 15, 2013, the entirety of which is incorporated herein by reference.

This application claims the benefit of priority under 35 U.S.C. §119(e) to U.S. Provisional Application Ser. No. 61/798,245 entitled "APPROXIMATE REPRESENTATIONS OF MULTIVARIATE POSTERIOR PROBABILITY DISTRIBUTIONS FROM SIMULATED POSTERIOR SAMPLES," filed Mar. 15, 2013, the entirety of which is incorporated herein by reference.

This application is related to U.S. patent application Ser. No. 14/217,858 filed concurrently herewith entitled "APPROXIMATE MULTIVARIATE POSTERIOR PROBABILITY DISTRIBUTIONS FROM SIMULATED SAMPLES," which is incorporated herein by reference in its entirety.

BACKGROUND

Data incorporating large quantities of variables is becoming increasingly commonplace, especially in data sets that are sufficiently large that they may be generated and/or stored by multiple computing devices. In addition to the challenges of handling such a large quantity of data, increasing the quantity of variables in a data set by even a small degree tends to add to at least the complexity of relationships among the data values, and may result in an increase in data size. Among such challenging data sets are large random samples generated by various forms of statistical analysis. Examples include large simulated samples randomly generated from a posterior probability distribution derived by the performance of a Bayesian analysis on a prior probability distribution, a model and/or various parameters.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

A computer-program product tangibly embodied in a non-transitory machine-readable storage medium, the computer-program product including instructions operable to cause a computing device to perform operations including order a plurality of un-normalized probability density functions (UPDFs) by a UPDF value of each UPDF, wherein the plurality of UPDFs is associated with a chain of draws of a set of simulated samples, wherein each draw comprises multiple parameters, and wherein the UPDF values of the plurality of UPDFs map to the parameter values of the parameters of the chain of draws; select a subset of the plurality of UPDFs based on the subset of the plurality of UPDFs having UPDF values within a range of UPDF values that corresponds to a specified range of parameter values to include in a subset of the set of simulated samples; and transmit to another computing device an indication of at least one draw of the chain comprising parameters having values to include in the subset of the set of simulated samples, wherein the indication identifies the at least one draw by referring to at least one UPDF of the plurality of UPDFs associated with the at least one draw.

A computer-implemented method comprising ordering, on a computing device, a plurality of un-normalized probability density functions (UPDFs) by a UPDF value of each UPDF, wherein the plurality of UPDFs is associated with a chain of draws of a set of simulated samples, wherein each draw comprises multiple parameters, and wherein the UPDF values of the plurality of UPDFs map to the multivariate parameter values of the parameters of the chain of draws; selecting, on the computing device, a subset of the plurality of UPDFs based on the subset of the plurality of UPDFs having UPDF values within a range of UPDF values that corresponds to a specified range of parameter values to include in a subset of the set of simulated samples; and transmitting, from the computing device, to another computing device an indication of at least one draw of the chain comprising parameters having values to include in the subset of the set of simulated samples, wherein the indication identifies the at least one draw by referring to at least one UPDF of the plurality of UPDFs associated with the at least one draw.

An apparatus comprising a processor component; a ranking component and a communications component. The ranking component orders a plurality of un-normalized probability density functions (UPDFs) by a UPDF value of each UPDF, wherein the plurality of UPDFs is associated with a chain of draws of a set of simulated samples, wherein each draw comprises multiple parameters, and wherein the UPDF values of the plurality of UPDFs map to the multivariate parameter values of the parameters of the chain of draws; and selects a subset of the plurality of UPDFs based on the subset of the plurality of UPDFs having UPDF values within a range of UPDF values that corresponds to a specified range of parameter values to include in a subset of the set of simulated samples. The communications component transmits to another computing device an indication of at least one draw of the chain comprising parameters having values to include in the subset of the set of simulated samples, wherein the indication identifies the at least one draw by referring to at least one UPDF of the plurality of UPDFs associated with the at least one draw.

A computer-program product tangibly embodied in a non-transitory machine-readable storage medium, the computer-program product including instructions operable to cause a computing device to perform operations including generate a portion of a set of simulated samples from a posterior probability distribution, wherein the set of simulated samples comprises a chain of draws of parameters; generate a portion of a set of un-normalized probability density functions (UPDFs), wherein each UPDF of the set of UPDFs is associated with one of the draws of the chain; select at least one draw of the chain to include in a subset of the set of simulated samples based on an indication of the at least one chain as included in the subset, wherein the indication specifies the at least one draw by at least one UPDF of the set of UPDFs, and wherein the at least one UPDF is associated with the at least one draw; and transmit parameter values of the at least one draw to a requesting device based on the indication.

A computer-implemented method comprising generating, at a computing device, a portion of a set of simulated samples from a posterior probability distribution, wherein the set of simulated samples comprises a chain of draws of parameters; generating, at the computing device, a portion of a set of un-normalized probability density functions (UPDFs), wherein each UPDF of the set of UPDFs is associated with one of the draws of the chain; select, at the computing device, at least one draw of the chain to include in a subset of the set of simulated samples based on an indication of the at least one chain as included in the subset, wherein the indication specifies the at least one draw by at least one UPDF of the set of UPDFs, and wherein the at least one UPDF is associated with the at least one draw; and transmitting, from the computing device, parameter values of the at least one draw to a requesting device based on the indication.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other features will become apparent from the following detailed description when considered in conjunction with the drawings.

DETAILED DESCRIPTION

Figure 1:
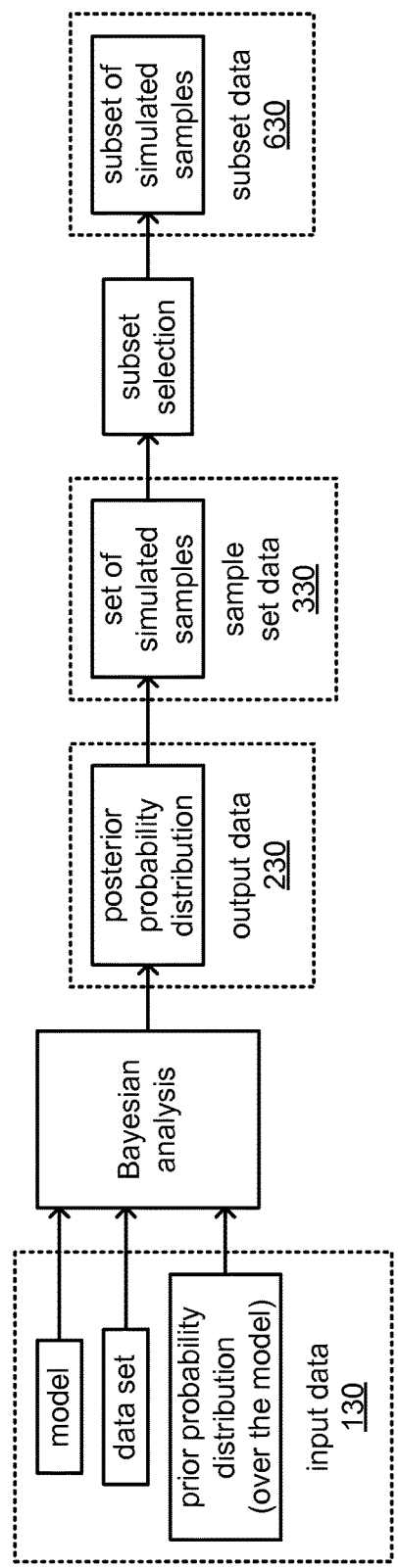
FIG. 1 illustrates an example of generation and use of a posterior probability distribution.

Various embodiments are generally directed to techniques for selecting a subset of a set of simulated samples randomly generated from a probability distribution. The probability distribution from which the set of simulated samples is generated may be a posterior probability distribution generated in a Bayesian analysis. As familiar to those skilled in the art, a set of simulated samples generated from a probability distribution may be relatively large in size and incorporate numerous variables, thereby making analysis thereof relatively difficult. A subset thereof may be more manageable in size and may be selected to enable analysis of a portion of the set of simulated samples that is of interest, such as a portion that represents a, a median, or selected range of percentiles.

Many kinds of modern analyses of scientific problems or business and industrial processes produce results in the form of a multivariate probability distribution (MPD). A MPD is a probability representation of the relationships between two or more variables. In many cases, the analytical form of the MPD is intractable and many techniques have been derived to provide an approximate representation of the MPD through simulation methods. These simulation methods typically generate multivariate random samples which tend to be very large. Such random samples may be conceptualized as logically forming a table, in which the rows (sometimes referred to as "draws") represent the individual sampled cases and the columns represent variables whose values indicate attributes of the samples cases. For such multivariate random samples the probabilistic dependencies among the variables are of great interest.

A random sample as described above may result in many different ways, including, for example, actual random sampling conducted as part of a scientific study or industrial quality control process, by the monitoring of various sensors as in industrial process control or environmental monitoring applications, and by computer simulation of a mathematical model as part of a statistical analysis. One kind of statistical analysis that results in such random samples, and a type of application of growing importance, is Bayesian statistical analysis. In Bayesian statistical analysis, a data set is analyzed through a statistical model for which a prior probability distribution needs to be provided. In particular, the prior probability distribution provides information about the parameters of the model chosen to analyze the data. From these inputs, a new probability distribution for the parameters, called the posterior distribution, is produced. The interest is in this posterior distribution, from which inference can be made regarding the parameter variables. In general, this posterior distribution cannot be calculated directly, but simulated posterior values can be computed. Thus, the result of the Bayesian statistical analysis often takes the form of a random sample from the posterior distribution. The problem of processing a random sample from the posterior distribution of a Bayesian statistical analysis is used as an illustration in the following; however, the principles disclosed herein can be applied to any application involving a random sample and is not restricted to problems of Bayesian analysis.

FIG. 1 illustrates an example of generating and selecting a subset of a set of simulated samples. As depicted, a Bayesian analysis is performed based on a data set, a mathematical model providing a predicted probability of observing various values associated with the data set, and a prior probability distribution over that model. The data set, the model and/or the prior probability distribution may be stored as part of an input data 130 in a computing device that performs at least a portion of the Bayesian analysis. From the Bayesian analysis, a posterior probability distribution is derived representing a probability distribution provided by the Bayesian analysis. From the posterior probability distribution a set of simulated samples may be generated to better enable an analysis of the posterior distribution. The posterior probability distribution and the set of simulated samples generated therefrom may be stored as output data 230 and sample set data 330.

As has been discussed; the set of simulated samples generated from the posterior probability distribution may be relatively large in size (e.g., the sample set data 330 may have a relatively large data size) and/or may include a relatively large number of variables. As will be explained in greater detail, a subset of multivariate simulated samples may be selected from the set of simulated samples based on a specified subset of univariate indexes. This subset of simulated samples ma be stored as subset data 630.

As familiar to those skilled in the art, a probability density function (PDF) is a function describing the relative probability of a random variable having a particular value. A PDF typically provides a univariate mapping to univariate or multivariate random variables, such as the parameters of a posterior distribution. If the posterior distribution is approximated by simulated samples (represented in 330), the simulated samples are also mapped to un-normalized PDFs (UPDFs). Each of these UPDFs may be generated to correspond to randomly generated simulated samples from the posterior distribution of the parameters. Each such set of simulated parameters is referred to as a "draw". The collection of these draws, which can be large, is referred to as a "chain". The lack of normalization of a UPDF can arise from the lack of division or multiplication of a UPDF by a constant that is typically unknown in Bayesian analysis. Despite being un-normalized, the relative values of the UPDFs still provides unique ranking of the multivariate draws.

A ranking of data values of a data set entails mapping a range of ranking values to the data values of the data set arranged in an increasing or decreasing order. Especially for relatively large data sets, the data values may be organized into ranges of data values where the ranges are sorted into an increasing or decreasing order, and then each of the ranges of data values may be mapped to a ranking value indicative of the ordering of the ranges. Once this is done, the ranking values may be employed as an index enabling selection of a subset of the data values by specifying a range of ranking values that may correspond to a desired range of percentiles of the data values, a median of the data values, etc.

As applied to the set of simulated samples, the UPDFs may be organized in an ascending or descending order. Due to the mapping between the relative univariate values of the UPDFs and the multivariate values of the draws with which each UPDF is associated, ordering the UPDFs in an increasing or decreasing order effectively ranks the multivariate values of the draws in a corresponding ascending or descending order. In effect, the values of the UPDFs become ranking values forming an indexing scheme by which the univariate values of the UPDFs are employed to organize the multivariate values of the parameters making up each draw without the processing complexity of working directly with those multivariate parameter values.

With this ordering of the UPDFs done, a subset of the draws may be selected by rank (e.g., by the values of their associated UPDFs) for inclusion in a subset of the simulated samples of the set of simulated samples. Although the UPDFs are mapped to the multivariate values of the draws, such ordering of the draws by the values of their associated UPDFs also tends to organize the relative parameter values of the individual parameters across multiple draws in an ascending or descending order. Thus, a percentile range of parameter values may be selected within some degree of accuracy by specifying a percentile range of UPDF values.

In some embodiments, multiple performances of the Bayesian analysis may take place in parallel across multiple computing devices, each using the same input data 130 (which includes a prior probability distribution, as previously discussed), and accordingly, each deriving the same output data 230 representing the same posterior probability distribution. Stated differently, the fact of each of those multiple computing devices performing the same Bayesian analysis with same input to that Bayesian analysis is relied upon to cause each of those computing devices to derive the same posterior probability distribution in parallel, but independently of each other. As an alternative, one of the multiple computing devices could be the sole computing device to perform the Bayesian analysis, and then distribute the output data 230 to the others of the multiple computing devices.

Regardless of the exact manner in which each of the multiple computing devices is provided with that poster probability distribution, the derivation of the set of simulated samples may be distributed among those multiple computing devices, with each of the multiple computing devices randomly generating a portion of the set of simulated samples from the posterior probability distribution. The fact of each of the computing devices generating a portion of the set of simulated samples in which values are generated randomly for each portion may be relied upon to cause each of the portions generated by each of the multiple computing devices to be different, rather than identical to each other. In such embodiments, amidst the random generation of each of the portions of the set of simulated samples, UPDFs associated with draws making up each of those portions of the set of simulated samples may also be generated, such that the generation of those UPDFs is performed in a distributed parallel manner as is the generation of the portions of the set of simulated samples.

The UPDFs may then be transmitted to a requesting device at which they are gathered together and ranked as has been described. Then, what draws of the set of simulated samples are to be included in the subset of simulated samples may be specified by specifying a range of the UPDFs. With the subset of simulated samples so specified by selecting a subset of the draws, the portions of the subset of simulated samples may be transmitted to a computing device at which they are gathered together for further analysis and/or generation of a visualization. Alternatively, the portions of the subset of simulated samples may be allowed to remain stored within each of the multiple computing devices in which they were originally generated, and further analysis of the subset may be performed in place by those multiple computing devices. In this way, the majority of each of the portions of the set of simulated samples are able to remain stored within the computing devices in which they were generated and need not be conveyed between computing devices.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Figure 2:
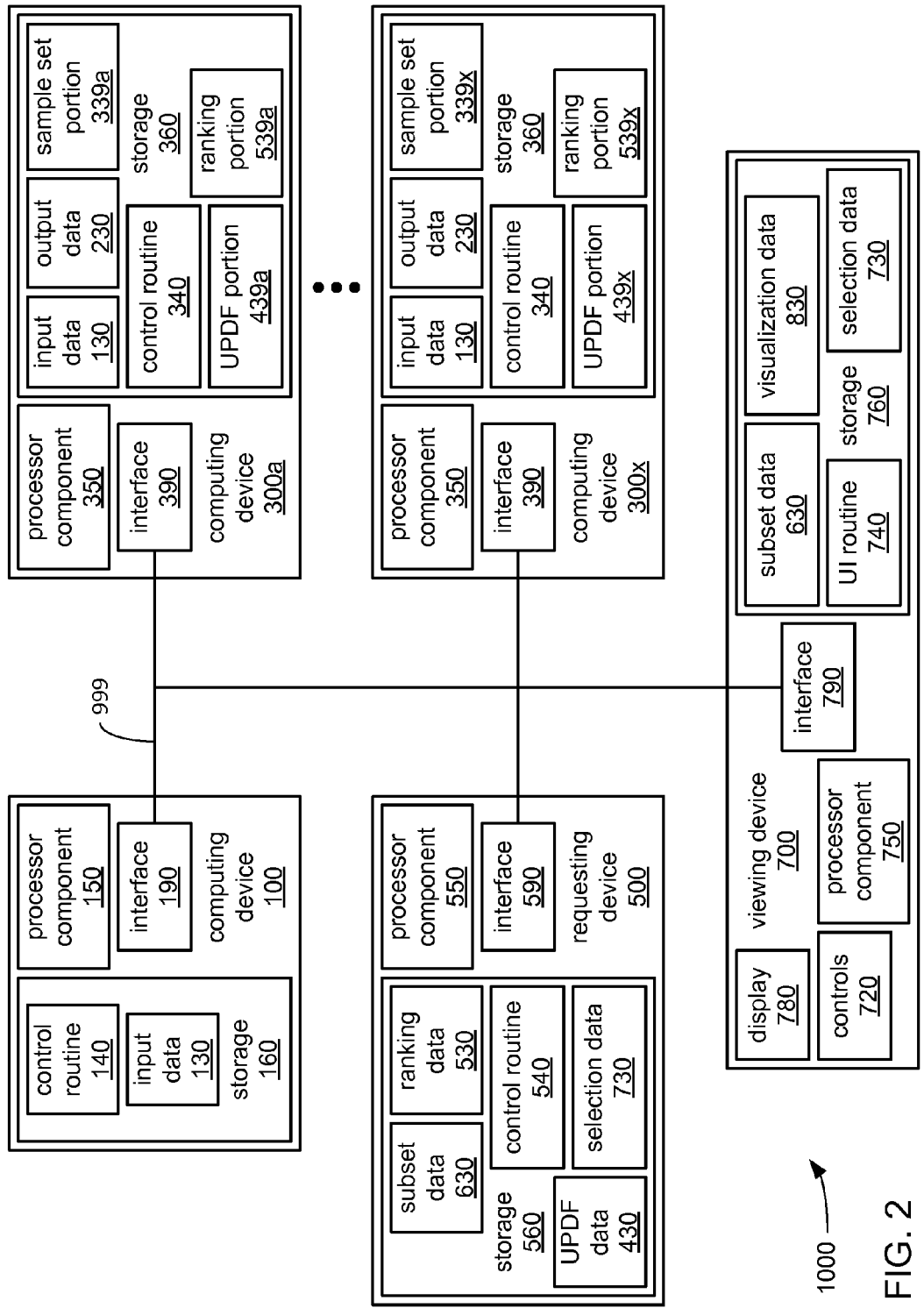
FIG. 2 illustrates an example of an analysis system.
Figure 3A:
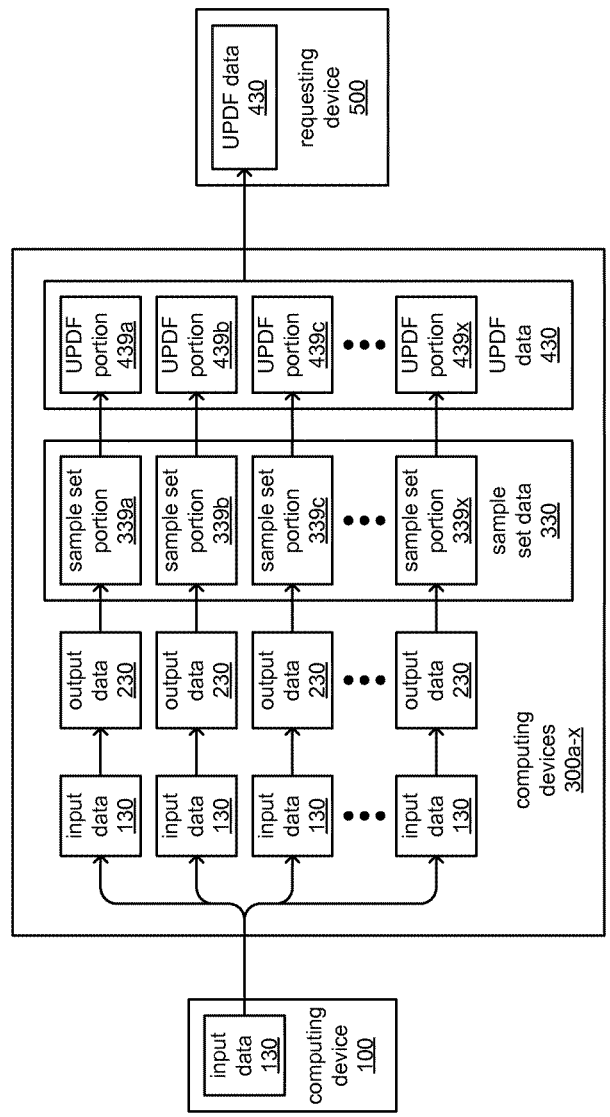
FIGS. 3A-C each illustrate an example of a distribution of data in an analysis system.
Figure 3B:
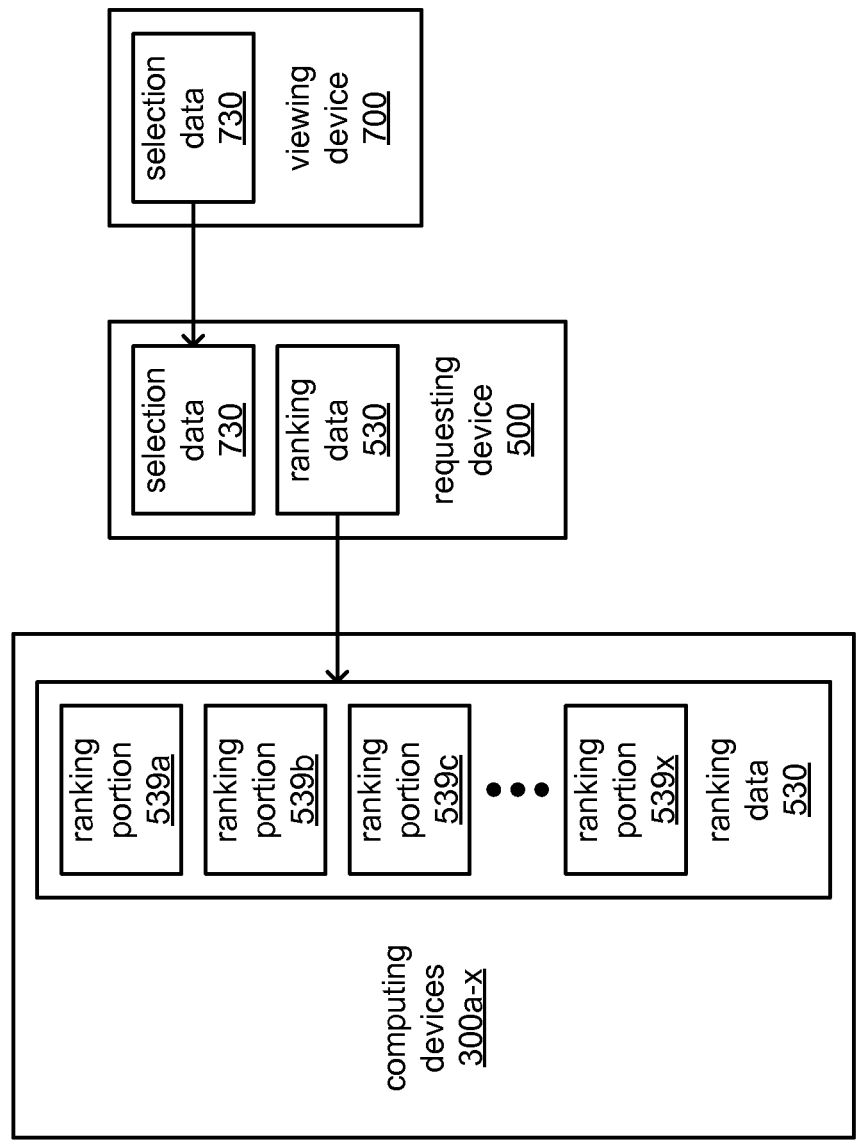
Figure 3C:
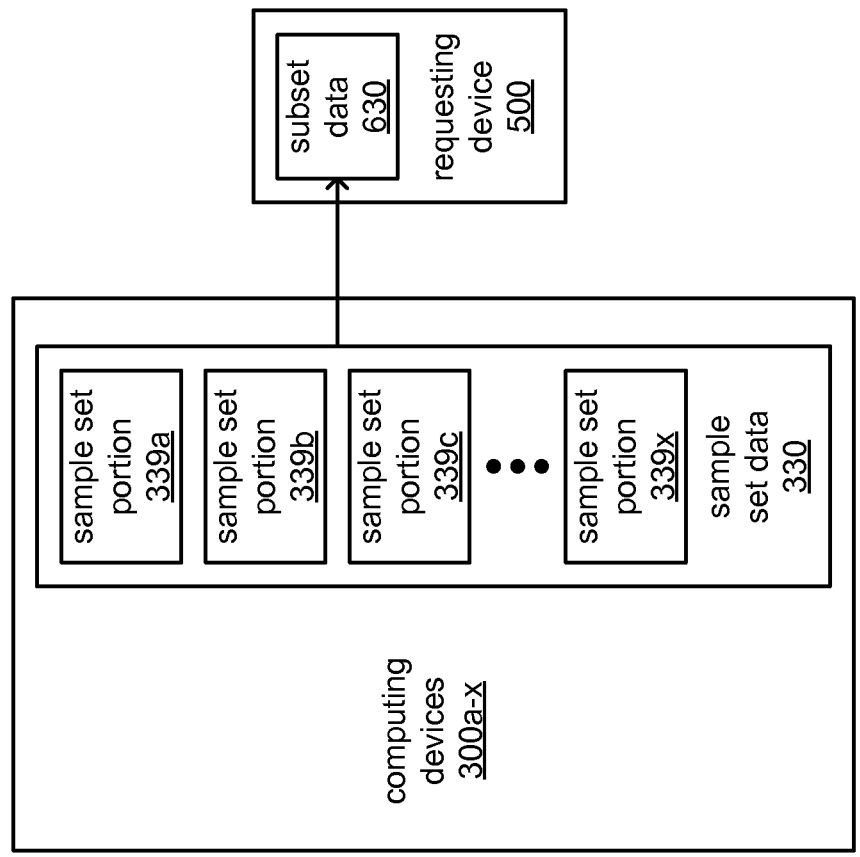

FIG. 2 illustrates a block diagram of an embodiment of an analysis system 1000 incorporating one or more of a computing device 100, multiple computing devices 300a-x, a requesting device 500 and/or a viewing device 700. FIGS. 3A through 3C, together, illustrate an embodiment of operation of the analysis system 1000. Each of these computing devices may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc. Embodiments are not limited in this context.

As depicted, these computing devices 100, 300a-x, 500 and/or 700 exchange communications conveying data associated with the relatively large sample set data 330 representing a set of simulated samples through a network 999 in support of generating the sample set data 330 and derivatives thereof. However, one or more of the computing devices 100, 300a-x, 500 and/or 700 may exchange other data entirely unrelated to the sample set data 330 with each other and/or with still other computing devices (not shown) via the network 999. In various embodiments, the network 999 may be a single network that may extend within a single building or other relatively limited area, a combination of connected networks that may extend a considerable distance, and/or may include the Internet. Thus, the network 999 may be based on any of a variety (or combination) of communications technologies by which communications may be effected, including without limitation, wired technologies employing electrically and/or optically conductive cabling, and wireless technologies employing infrared, radio frequency or other forms of wireless transmission.

It should be noted that although two computing devices 300a and 300x are specifically depicted, this depiction is intended to denote a plurality of computing devices of any quantity designated "300a" through "300x." In some embodiments, at least the computing device 300a-x may form an array or "grid" of computing devices able to be operated together in a coordinated manner to perform portions of a search, calculation, etc. in parallel. The computing devices 300a-x may exchange communications through the network 999 to effect such coordination. One or more of the computing devices 300a-x may serve a coordinating function by distributing input data to the others and/or receiving output data from the others. Alternatively or additionally, one or more other computing devices (e.g., the computing devices 100 and/or 500) may perform at least part of such a coordinating function.

Turning more specifically to FIG. 3A, as previously discussed, each of the multiple computing devices 300a-x may perform the same Bayesian analysis using the same input data 130 to each derive the same output data 230. More precisely, the Bayesian analysis performed to derive the output data 230 representing a posterior probability distribution from the input data 130 may be performed in parallel in multiple independent instances by the multiple computing devices 300a-x such that each of the computing devices 300a-x independently derives the same output data 230 representing the same poster probability distribution. This may be followed by generation of the different sample portions 339a-x of the sample set data 330 by corresponding ones of the computing devices 300a-x, all from the same output data 230 and in parallel. In support of performing multiple parallel instances of the same Bayesian analysis, the computing device 100 may distribute the input data 130 representing a data set, a model and a prior probability distribution to each of the computing devices 300a-x. The computing device 100 may exchange further communications with each of the computing devices 300a-x to coordinate their performances of the Bayesian analysis in parallel.

As previously discussed, the generation of a set of simulated samples from a posterior probability distribution may also result in the generation of corresponding UPDFs. Thus, just as the sample set data 330 representing a set of simulated samples is generated as multiple sample set portions 339a-x in parallel such that the set data 330 is distributed among the computing devices 300a-x, respectively, UPDF data 430 representing the UPDFs of the set of simulated samples may also be generated as multiple UPDF portions 439a-x in parallel and such that the UPDF data 430 is also distributed among the computing devices 300a-x, respectively.

The UPDF portions 439a-x may be subsequently combined to form the UPDF data 430 by gathering together all of the UPDFs represented by all of the UPDF portions 493a-x into a single set of UPDFs represented by the UPDF data 430. This may be done either among the computing devices 300a-x before the UPDF data 430 is provided to the requesting device 500, or by the requesting device 500 following receipt of the UPDF portions 439a-x from one or more of the computing devices 300a-x. The requesting device 500 ranks the UPDFs represented by the UPDF data 430. More precisely, the requesting device 500 organizes the UPDFs of the UPDF data 430 by their values into an increasing or decreasing order.

Turning more specifically to FIG. 3B, an indication of the ranking of the UPDFs into an ascending or descending order by their values may be stored by the computing device 500 as ranking data 530. The ranking data 530 may then be subdivided into ranking portions 539a-x to be transmitted by the requesting device 500 to corresponding ones of the computing devices 300a-x, respectively. Each of the ranking portions 539a-x provides an indication of the ordering of at least the UPDFs associated with draws stored within corresponding ones of the sample set portions 339a-x.

The requesting device 500 may also receive from the viewing device 700 selection data 730 providing an indication of a subset of the sample set data 330 to be retrieved from one or more of the computing devices 300a-x for further analysis and/or for visualization. The selection data 730 may indicate the subset by indicating a range of values of parameters to be included in the subset. This indication may be expressed in any of a variety of ways. By way of example, a percentile or a range of percentiles of parameter values may be specified. The requesting device 500 parses the indication of the subset in the selection data 730, and determines what range of UPDF values among the order of UPDF values indicated in the ranking data 530 are associated with draws of parameters in the set of simulated samples in which one of the parameters may have a value falling within the range of parameters values specified in the selection data 730. Regardless of the exact manner in which an indication is provided to the requesting device 500 of what subset of the set of simulated samples is selected to be included in the subset, the requesting device 500 may include in each of the ranking portions 539a-x an indication of UPDFs that correspond to the draws of parameters stored in corresponding ones of the sample set portions 339a-x that are to be included in the subset.

Turning more specifically to FIG. 3C, one or more of the computing devices 300a-x retrieve, from one or more of the simulation data portions 339a-x, the draws indicated by specific UPDFs in corresponding ones of the ranking data 539a-x as selected for inclusion in the subset of the simulated samples. In some embodiments, one or more of the computing devices 300a-x then provide those selected ones of the draws retrieved from one or more of the sample set portions 339a-x to the requesting device 500 as subset data 630, thereby providing the requesting device 500 with the subset of the simulated samples. It should be noted that, despite the specific depiction and discussion of the computing devices 300a-x providing the subset of the simulated samples to the requesting device 500 (e.g., the same computing device that makes the request for the subset), other embodiments are possible in which the computing devices 300a-x provide the subset (in the form of the subset data 630) to a different computing device (not shown). In this way, only the subset is conveyed by the computing devices 300a-x to another computing device, instead of a large portion (or all) of the set of simulated samples represented by the sample set data 330.

However, in other embodiments, the draws within each of the sample set portions 339a-x that are selected via their associated UPDFs may not be provided by computing devices 300a-x, respectively, to any other computing device. Instead, the computing devices 300a-x may be operated to each perform a portion of a further analysis in parallel, using the selected ones of the draws of their respective ones of the sample set portions 339a-x as an input to the portion that each performs. This may enable the exchange of any portion of sample set data 330 among computing devices to be avoided by making use of the set of simulated samples represented by the sample set data 330 in place where it is already stored among the computing devices 300a-x.

Returning now to FIG. 2, in various embodiments, the computing device 100 incorporates one or more of a processor component 150, a storage 160 and an interface 190 to couple the computing device 100 to the network 999. The storage 160 may store the input data 130 and a control routine 140. The control routine 140 incorporates a sequence of instructions operative on the processor component 150 to implement logic to perform various functions. In executing the control routine 140, the processor component 150 exchanges communications with the computing devices 300a-x via the network 999 to at least prepare for a performance of a Bayesian analysis.

Figure 4:
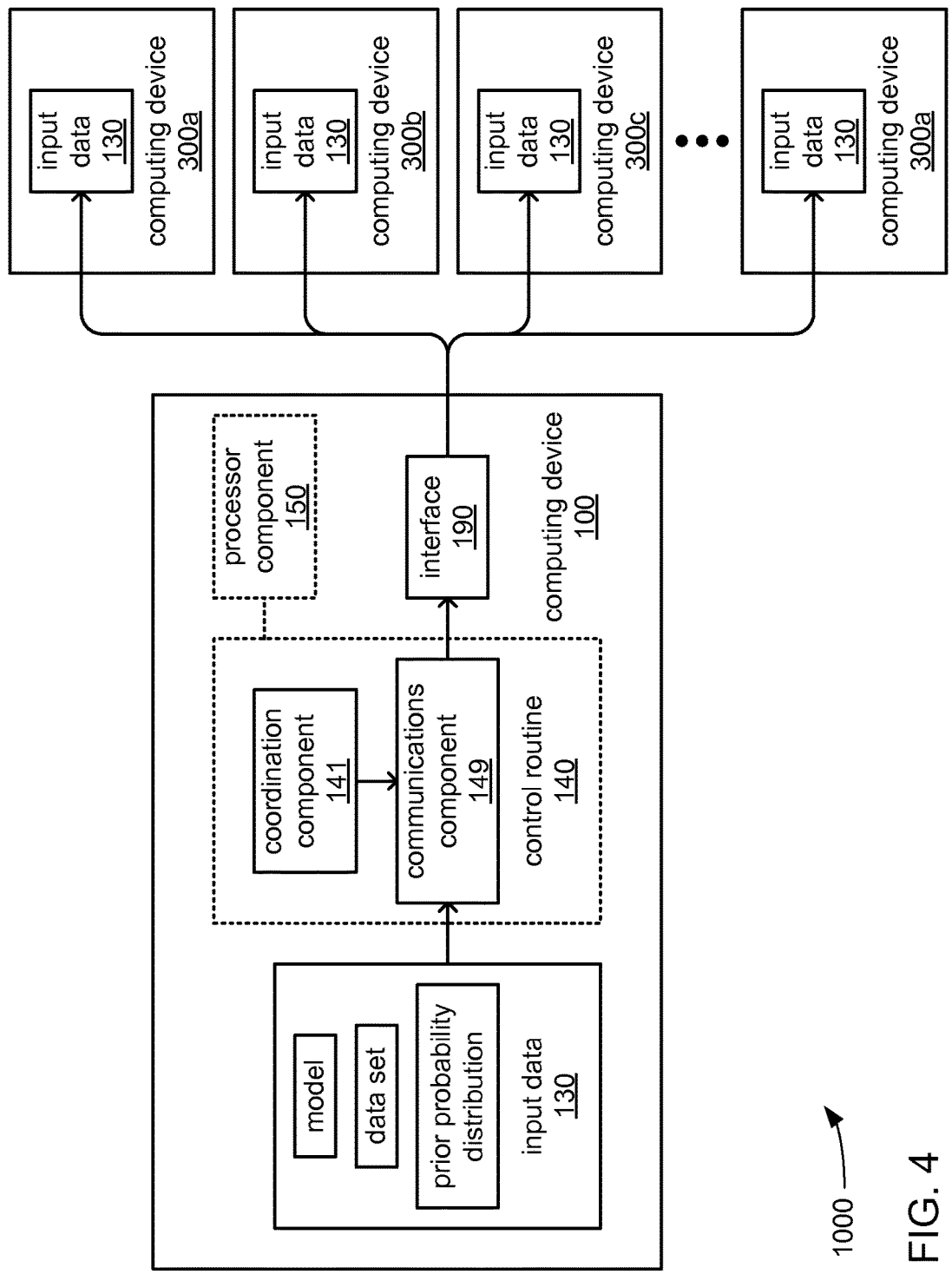
FIGS. 4-6 each illustrate an example of a portion of an embodiment of an analysis system.

FIG. 4 depicts an embodiment of such communications among the computing devices 100 and 300a-x in greater detail. As depicted, the control routine 140 may incorporate one or more of a coordination component 141 and a communications component 149. In executing the control routine 140, the processor component 150 may execute the coordination component 141 and/or the communications component 149.

In preparation for the performance of multiple instances of a Bayesian analysis by the computing devices 300a-x, the communications component 149 operates the interface 190 to transmit the input data 130 to each of the computing devices 300a-x. Following distribution of the input data 130, the coordination component 141 may operate the interface 190 to provide a trigger to one or more of the computing devices 300a-x to begin performance their performances of the Bayesian analysis via the network 999.

Returning to FIG. 2, in various embodiments, each of the computing devices 300a-x incorporates one or more of a processor component 350, a storage 360 and an interface 390 to couple each of the computing devices 300a-x to the network 999. The storage 360 of each of the computing devices 300a-x may store one of at least a portion of the input data 130, the output data 230, one of the sample set portions 339a-x, one of the UPDF portions 439a-x, one of the ranking portions 539a-x and a control routine 340. The control routine 340 incorporates a sequence of instructions operative on the processor component 350 to implement logic to perform various functions. In executing the control routine 340, the processor component 350 of each of the computing devices 300a-x may perform the same Bayesian analysis to each separately derive the output data 230 from the input data 130 in parallel. The processor component 350 of each of the computing devices 300a-x may then generate a portion of the sample set data 330 (e.g., a corresponding one of the sample set portions 339a-x) and a portion of the UPDF data 430 (e.g., a corresponding one of the UPDF portions 439a-x) from the output data 230. In further executing the control routine 340, the processor component(s) 350 of one or more of the computing devices 300a-x may transmit a subset of the sample set data 330 to another computing device (e.g., the requesting device 500) in response to a ranking-based indication of what draws of parameters of sample set data 330 are included within that subset.

Figure 5:
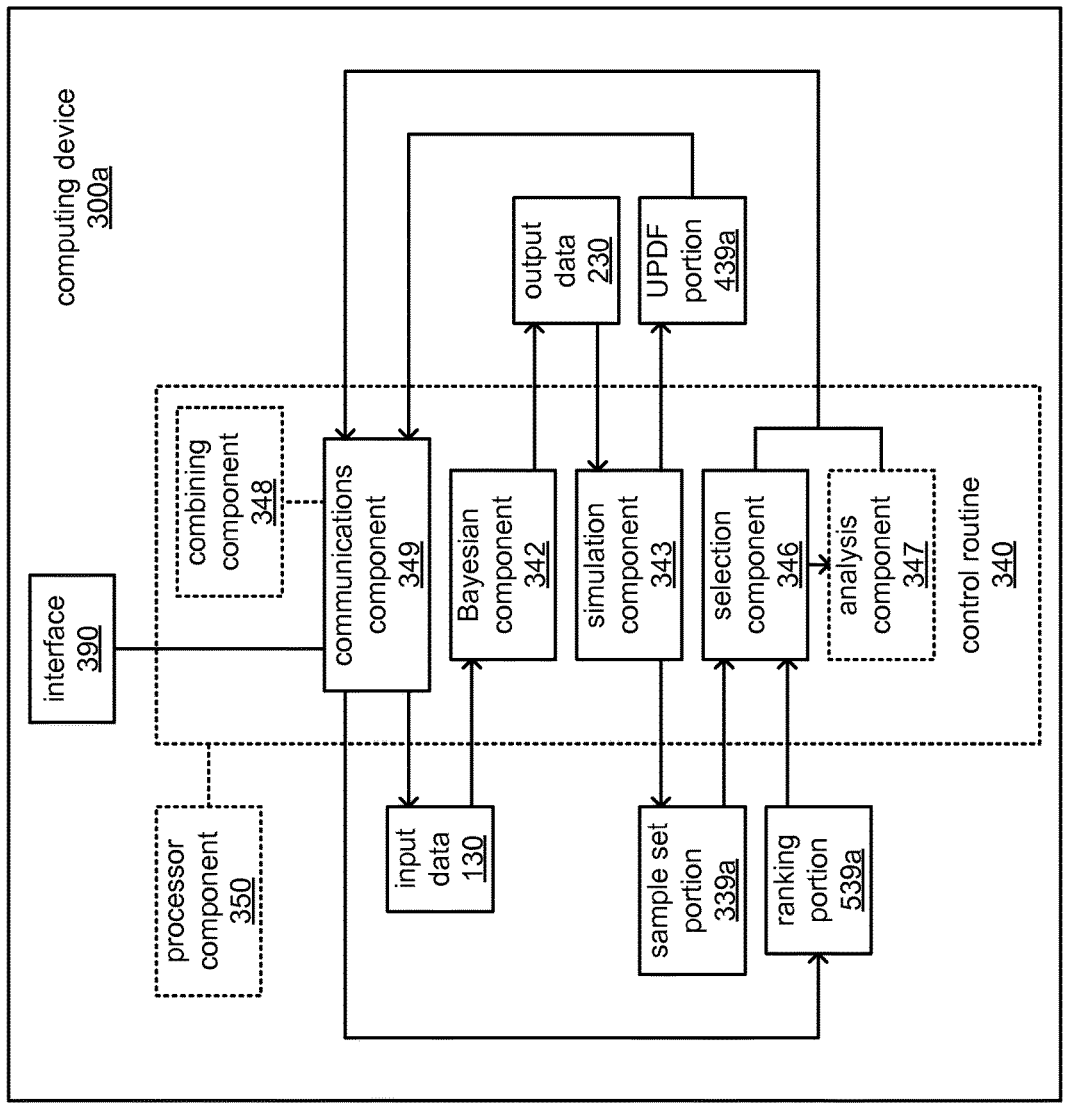

FIG. 5 depicts an embodiment of such a performance of a Bayesian analysis, generation of a portion of the set of simulated samples 330 and selection of a portion of the subset thereof in greater detail. Such details associated with the operation of the computing device 300a are depicted as an example of such operation of all of the computing devices 300a-x. As depicted, the control routine 340 may incorporate one or more of a Bayesian component 342, a simulation component 343, a selection component 346, an analysis component 347, a combining component 348 and a communications component 349. In executing the control routine 340, the processor component 350 may execute one or more of the Bayesian component 342, the simulation component 343, the selection component 346, the analysis component 347, the combining component 348 and the communications component 349.

In preparation for the computing device 300a performing the Bayesian analysis, the communications component 349 operates the interface 390 to receive the input data 130 via the network 999. The communications component 349 may also receive from the computing device 100 and/or one or more of the others of computing devices 300a-x a command or other communication serving as a trigger to begin such performance. The Bayesian component 342 employs at least a prior probability distribution represented by the input data 130 in performing a Bayesian analysis in which the output data 230 is generated.

The simulation component 343 generates the sample set portion 339a from the output data 230, thereby generating a portion of a set of simulated samples. The simulation component 343 also generates the UPDF portion 439a, thereby generating UPDFs that correspond to the draws included in the sample set portion 339a.

In some embodiments, the communication component 349 may operate the interface 390 to transmit the UPDF portion 439a to another of the computing devices 300a-x or to the requesting device 500 via the network 999 to enable the UPDFs of the UPDF portion 439a to be combined with the UPDFs of the others of the UPDF portions 439a-x to form the UPDF data 430. Alternatively or additionally, the communication component 349 may operate the interface 390 to receive others of the UPDF portions 439a-x via the network 999 to enable the combining component 348 of the computing device 300a to perform such combining to form the UPDF data 430 within the computing device 300a. After such combining, the communications component 349 may transmit the UPDF data 430 to the requesting device 500.

Following the provision of the UPDF data 430, in whatever manner, to the requesting device 500, the communication component 349 may operate the interface 390 to receive the ranking portion 539a from the requesting device 500 via the network 999. As has been discussed, the requesting device 500 may include in each of the ranking portions 539a-x of the ranking data 530 indications of the ordering of draws stored within each of the sample set portions 339a-x, respectively. The ordering of the draws within each of the sample data portions 339a-x may be expressed as an ordering of their associated UPDFs. Alternatively or additionally, the requesting device 500 may include in each of the ranking portions 539a-x indications of which draws stored within each of the sample set portions 339a-x are selected for inclusion in a subset of simulated samples out of the set of simulated samples represented by the sample set data 330. Which ones of the draws are so selected is indicated by their associated UPDFs, and in some embodiments, the indication may be expressed as a range of UPDFs that makes reference to an indication of an ordering of UPDFs provided to indicate an ordering of associated draws.

The selection component 346 employs the indication of ordering of the draws within the sample set portion 339a and/or the indication of which draws of the sample set portion 339a are selected for inclusion in the subset of simulated samples to retrieve the selected draws from the sample set portion 339a. The selection component 346 may further cooperate with the communications component 349 to operate the interface 390 to transmit the retrieved draws of the sample set portion 339a to the requesting device 500, thereby providing the requesting device 500 with whatever portion of the selected subset of the simulated samples that may be present within the sample set portion 339a.

Alternatively or additionally, following retrieval of the selected ones of the draws by the selection component 346, the analysis component 347 (if present) may employ those selected draws as an input to perform a portion of a further analysis in parallel with counterpart ones of the analysis component 347 of others of the computing devices 300a-x. In this way, exchanges of even a subset of the set of simulated samples may be entirely avoided.

The execution of one or more of the Bayesian component 342, the simulation 343, and the selection component 346 may occur in parallel across multiple ones of the computing devices 300a-x as corresponding ones of the processor components 350 each independently execute a corresponding instance of the control routine 340. This enables at least the majority of the set of simulated samples distributed among the computing devices 300a-x as the sample set portions 339a-x, respectively, to each remain stored within corresponding ones of the computing devices 300a-x, thus obviating the need to incur the added time and network resources required to exchange any of the data portions 339a-x among computing devices. However, it should be noted that despite the depiction and discussion of the set of simulated samples as distributed among multiple computing devices, other embodiments are possible in which the set of simulated samples are distributed among multiple virtual computing devices that may be implemented within a smaller number of physical computing devices. Thus, such parallel performance of instances of a Bayesian analysis and generation of the set of simulated samples may be performed on multiple execution threads allocated for parallel execution by a smaller number of computing devices.

Returning to FIG. 2, in various embodiments, the requesting device 500 incorporates one or more of a processor component 550, a storage 560 and an interface 590 to couple the requesting device 500 to the network 999. The storage 560 may store one or more of the UPDF data 430, the ranking data 530, the subset data 630, the selection data 730 and a control routine 540. The control routine 540 incorporates a sequence of instructions operative on the processor component 550 to implement logic to perform various functions. In executing the control routine 540, the processor component 550 generates a mapping of ranking values to ranges of data values of the sample set data 330, retrieves a subset of the sample set data 330 selected using one or more of the ranking values, and stores that subset as the subset data 630 for use in performing further analyses and/or generating visualizations.

Figure 6:
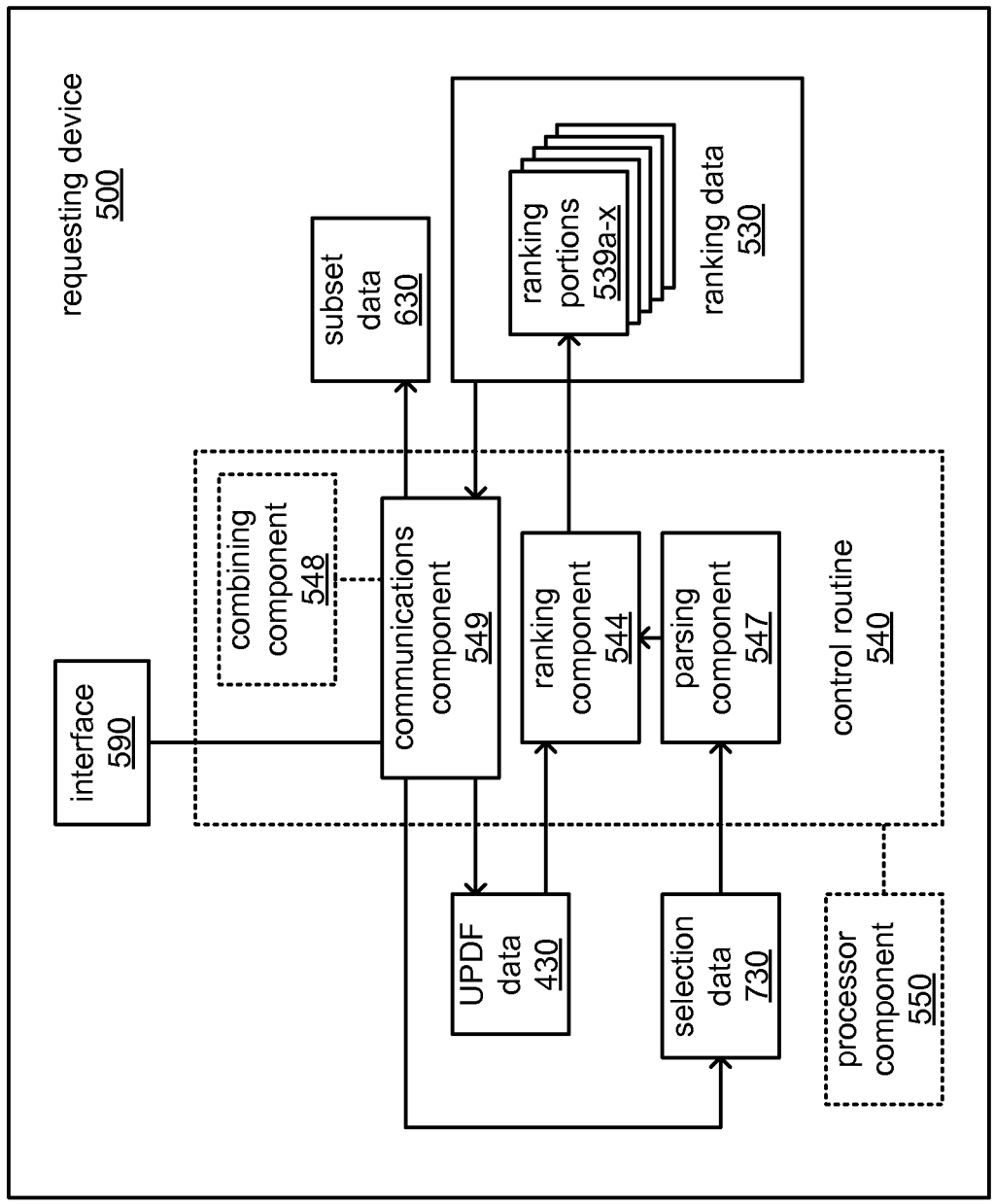

FIG. 6 depicts an embodiment of such generation of a mapping and retrieval of a subset of the sample set data 330 in greater detail. As depicted, the control routine 540 may incorporate one or more of a ranking component 544, a parsing component 547, a combining component 548 and a communications component 549. In executing the control routine 540, the processor component 550 may execute one or more of the components 544, 547, 548 and 549 of the control routine 540.

As previously discussed, the UPDF data 430 is formed by combining the UPDF portions 439a-x separately derived in parallel by corresponding ones of the computing devices 300a-x. In embodiments in which such combining is performed by or among one or more of the computing devices 300a-x, the communications component 549 may operate the interface 540 to receive the UPDF data 430 from one of the computing devices 300a-x via the network 999. In such embodiments, the control routine 540 may not incorporate the combining component 548. However, in embodiments in which such combining is performed by the requesting device 500, the communications component 549 may operate the interface 540 to receive each of the UPDF portions 439a-x from one or more of the computing devices 300a-x. In such embodiments, the combining component 548 may be present and may gather together the UPDFs of all of the UPDF portions 439a-x into a single set of UPDFs to form the UPDF data 430 within the requesting device 500.

The ranking component 544 retrieves the indications of the earlier-described un-normalized probability density functions from the UPDF data 430 and employs those UPDFs to rank the draws of parameters associated with those UPDFs, as has been discussed. The ranking component then generates each of the ranking portions 539a-x to include an indication of the ordering of draws within corresponding ones of the sample set portions 339a-x by indicating the ordering of their associated ones of the UPDFs.

As previously discussed, the selection data 730 includes an indication of a range of parameter values of all of the parameters of all of the draws in the set of simulated samples that are to be selected for inclusion in a subset of the simulated samples that may be provided by the computing devices 300a-x as the subset data 630. As also previously discussed, this indication in the selection data 730 may be expressed in any of a variety of ways. The parsing component 547 parses this indication and cooperates with the ranking component 544 to determine what UPDFs are associated with draws that may include a parameter having a parameter value that falls within that range of parameter values in the set of simulated samples. The ranking component 544 then determines which of the selected UPDFs belong to which sample data sets 339a-x, and stores in each of the ranking portions 539a-x indications of what draws within each of corresponding ones of the sample data sets 339a-x are to be included in the subset, using the UPDFs associated with those draws to specify those draws as so included.

Following such generation of the ranking data 530 (e.g., the ranking portions 539a-x), the communications component 549 may operate the interface 590 to transmit the ranking portions 539a-x to corresponding ones of the computing devices 300a-x via the network 999. The communications component 549 may then operate the interface 590 to receive subsets of the sample set portions 339a-x, where these subsets are made up of the draws selected from each of the sample set portions 339a-x. As these subsets of the simulation data portions 339a-x are received, the combining component 548 may gather together the draws from each of these subsets to form the subset data 630. In this way, the subset data 630 is formed to include the selected subset of the simulated samples specified in the selection data 730.

Following the generation of the subset data 630, the communications component 549 may operate the interface 590 to transmit the subset data 630 to another device (e.g., the computing device 100 or the viewing device 700) via the network 999 for use as an input in further analysis and/or in generating a visualization. This may be done in response to a request received from another computing device for the subset data 630. It should be noted that the subset data 630 may remain stored within the storage 560 for some time before it is so transmitted and/or used.

It should be noted that, despite the specific depiction and discussion of the requesting device 500 performing the ranking of draws based on UPDFs and/or the generation of the subset data 630, other embodiments are possible in which one or more of the computing devices 300a-x performs one or more of these functions. It should also be noted that, despite the specific depiction and discussion of the computing device 100 distributing the input data 130 among the computing devices 300a-x, other embodiments are possible in which one or more of the computing devices 300a-x does so.

Returning to FIG. 2, in various embodiments, the viewing device 700 incorporates one or more of a processor component 750, a storage 760, a display 780, controls 720 and an interface 790 to couple the viewing device 700 to the network 999. The storage 760 may store one or more of each of the subset data 630, the selection data 730, visualization data 830 and a user interface (UI) routine 740. The UI routine 740 incorporates a sequence of instructions operative on the processor component 750 to implement logic to perform various functions. In executing the UI routine 740, the processor component 750 operates the interface 790 to receive the subset data 630 from the requesting device 500 via the network 999, generates the visualization data 830 therefrom, and operates the display 780 to present a visualization represented by the visualization data 830. The processor component also operates the controls 720 and the display 780 to provide a UI to enable an operator of the viewing device 700 to control aspects of the generation of such a visualization. Alternatively or additionally, the processor component 750 may monitor the controls 720 for indications of manual operation thereof by an operator to provide an indication of what draws of parameters of the chain of draws making up the set of simulated samples represented by the sample set data 330 are selected for inclusion in the subset thereof represented by the subset data 630. The processor component 750 may store such an indication as the selection data 730 and transmit the selection data 730 to the requesting device 500 via the network 999.

Figure 7:
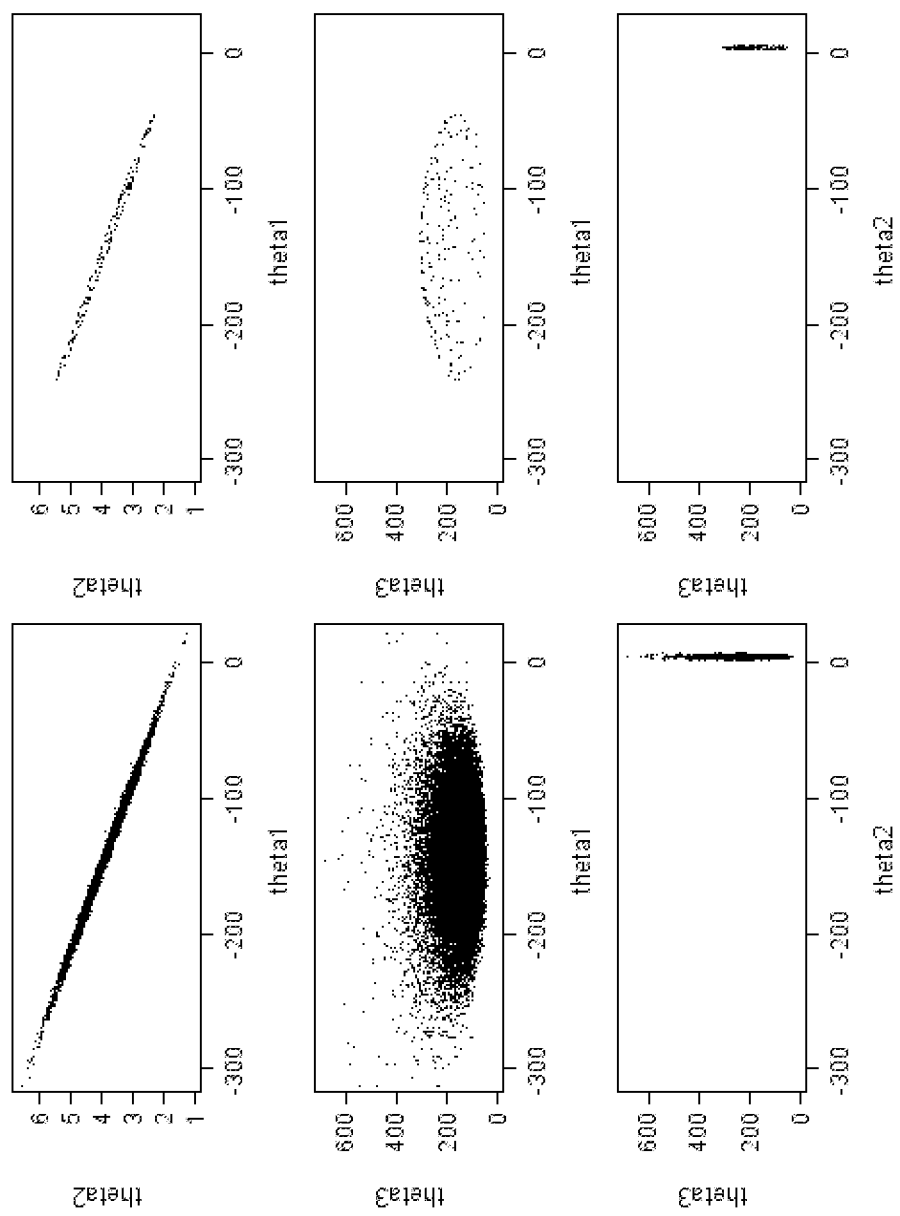
FIG. 7 illustrates another example of generation and use of a posterior probability distribution.

FIG. 7 depicts an example of operation of the analysis system 1000 to generate a visualization of a subset of an example set of simulated samples generated from a posterior probability distribution. In this example, a posterior probability distribution associated with a linear regression model Y=theta1+(theta2)X+e where e~normal(mean=0, variance=theta3) is derived by a Bayesian or other analysis, multiple instances of which may be performed in parallel by the computing devices 300a-x. In so doing, each of the computing devices 300a-x independently derives the output data 230 representing this posterior probability distribution.

From the output data 230, each of the computing devices 300a-x generates a set of simulated samples stored as the sample set portions 339a-x, respectively, and including a chain of 1 to n draws where each draw is made up of 1 to k parameters θ. In so doing, the computing devices 300a-x also generate corresponding UPDFs stored as the UPDF portions 439a-x, respectively, with one UPDF associated with each draw as follows:

$\theta_{1,1}$ $\theta_{1,2}$ ... $\theta_{1,k}$→$UPDF_1$
$\theta_{2,1}$ $\theta_{2,2}$ ... $\theta_{2,k}$→$UPDF_2$
............→...
$\theta_{n,1}$ $\theta_{n,2}$ ... $\theta_{n,k}$→$UPDF_n$ In this example, n=60,000 such that there are 60,000 draws making up the chain of draws, and k=3 such that each draw is made up of three parameters θ. Also, in this example, each of the three parameters θ corresponds to one of three axes theta1, theta2 and theta3 of the six graphs depicted in FIG. 7.

The six graphs of FIG. 7 include two sets of graphs. The three graphs on the left depict a visualization generated using all of the points defined by the values of the three parameters θ of each draw used as coordinates. The three graphs on the right depict a visualization generated using points defined by the values of the three parameters θ of only 200 of the 60,000 draws. Specifically, parameter values of draws 56900 to 57100 representing approximately the 95th percentile of the parameter values among all of the parameters θ of this example set of simulated samples were selected as a subset for use in generating the three graphs on the right.

To effect this selection, the computing devices 300a-x may send the UPDF portions 439a-x to the computing device 500 which may combine the UPDFs therein to create the UPDF data 430. The computing device 500 may then organize the UPDFs of the UPDF data 430 into an ascending or descending order, thereby ranking the draws associated with the UPDFs. The computing device 500 may also receive the selection data 730 indicating that the subset of this example set of simulated samples is to include parameter values in the 95th percentile. The computing device 500 selects the ones of the UPDFs having UPDF values that are within the 95th percentile of the all of the values of all of the UPDFs. This results in the draws associated with those selected UPDFs (draws 56900 through 57100, in this example) to be selected for inclusion in the subset of this example set of simulated samples.

The computing device 500 then generates the ranking portions 539a-x of the ranking data 530, each of the ranking portions 539a-x including an indication of the order of UPDFs associated with draws present in the corresponding ones of the sample set portions 339a-x. Each of the ranking portions 539a-x also includes an indication of which ones of the draws present in the corresponding ones of the sample set portions 339a-x are to be included in the subset of this example set of simulated samples, and does so by indicating the UPDFs associated with those selected draws. The computing device 500 then transmits the ranking portions 539a-x to the computing devices 300a-x, respectively.

In response to receiving the ranking portions 539a-x, each of the computing devices 300a-x employs the indication of ordering of the draws (as indicated by an ordering of their associated UPDFs) and the indication of which of the draws are selected (again, as indicated by reference to their associated UPDFs) to retrieve the draws to be so included from the sample set portions 339a-x, respectively. The computing devices 300a-x then transmit the ones of the selected draws present in the sample set portions 339a-x, respectively, to the computing device 500, which gathers together all of the selected draws to generate the subset data 630. The computing device 500 then transmits the subset data 630 to the viewing device 700 to generate a visualization therefrom that may include the three graphs on the right in FIG. 7.

Each of the processor components 150, 350, 550 and 750 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are linked.

In various embodiments, each of the storages 160, 360, 560 and 760 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 190, 390, 590 and 790 may employ any of a wide variety of communications technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 8:
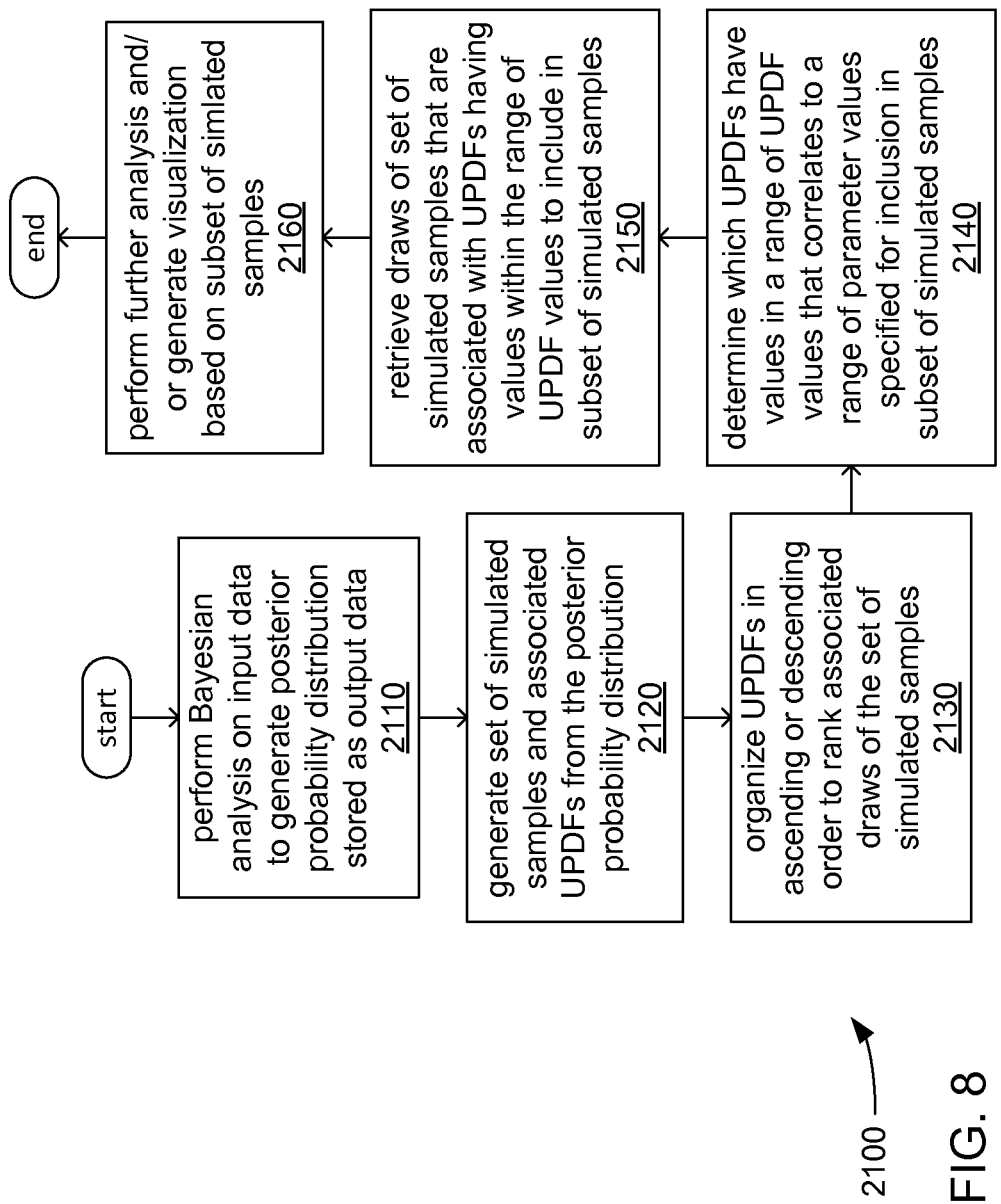
FIG. 8 illustrates an embodiment of a logic flow of generating a subset of a set of simulated samples.

FIG. 8 illustrates an embodiment of a logic flow 2100. The logic flow 2100 may be representative of some or all of the operations executed by one or more embodiments described herein. More specifically, the logic flow 2100 may illustrate operations performed by the processor components 150, 350 and/or 550 in executing the control routines 140, 340 and/or 540, respectively, and/or performed by other component(s) of at least the computing devices 100, 300*a-x* and/or 500 in generating the subset data 630.

At 2110, processor components of multiple computing devices (e.g., the processor component 350 of each of the multiple computing devices 300*a-x*) each independently perform the same Bayesian analysis on the same input data (e.g., the input data 130) that includes one or more of a prior probability distribution, a model and a data set. In so doing, each of the multiple computing devices derives the same output data (e.g., the output data 230) that includes the same posterior probability distribution in parallel. As previously discussed, such performances of instances of the same Bayesian analysis may be performed in parallel by multiple computing devices forming an array or "grid" of computing devices.

At 2120, the processor component of each of the multiple computing devices generates a portion of a set of simulated samples made up of a chain of draws (e.g., the sample set portions 339*a-x* of the sample set data 330), and a portion of a set of un-normalized probability density functions (UPDFs) that correspond to those draws (e.g., the UPDF portions 439*a-x* of the UPDF data 430) from the output data that each generated during the Bayesian analysis. As previously discussed, each UPDF differs from a conventional PDF in that a multiplicative constant has not been applied to cause each to be normalized. Despite this, each UPDF still provides a univariate map to the multivariate draws. At 2130, at least one processor component of a requesting device (e.g., the processor component 550 of the requesting device 500) ranks the draws by ordering their associated UPDFs by the values of the UPDFs in an ascending or descending order.

At 2140, the at least one processor component determines which UPDFs have values in a range of UPDF values that correlates to a range of parameter values that are specified (e.g., within the selection data 730) for inclusion in a subset of the set of simulated samples (e.g., the subset data 630). Those UPDFs having values in such a range of UPDF values become a subset of UPDFs that are associated with draws of parameters that have parameter values that are to be included in the subset of simulated samples. As previously discussed, the specification of what parameter values are to be included in the subset of simulated samples may be provided by via operation of manually operable controls and/or indicated in selection data received from yet another computing device (e.g., the selection data 730 received from the viewing device 700 via the network 999).

At 2150, the processor components of the multiple computing devices employ the subset of UPDFs to retrieve the draws associated with those UPDFs to form the subset of simulated samples. Thus, a subset of the draws within the set of simulated samples is selected by being associated with the subset of UPDFs, and that subset of draws within the set of simulated samples are retrieved from the set of simulated samples to become the subset of simulated samples.

At 2160, the subset of simulated samples is either used in further analysis or to generate a visualization. As has been discussed, the draws making up the subset may remain stored among the multiple computing devices where such further analysis may be performed, or may be transmitted to another computing device performing such analysis or generating the visualization.

Figure 9:
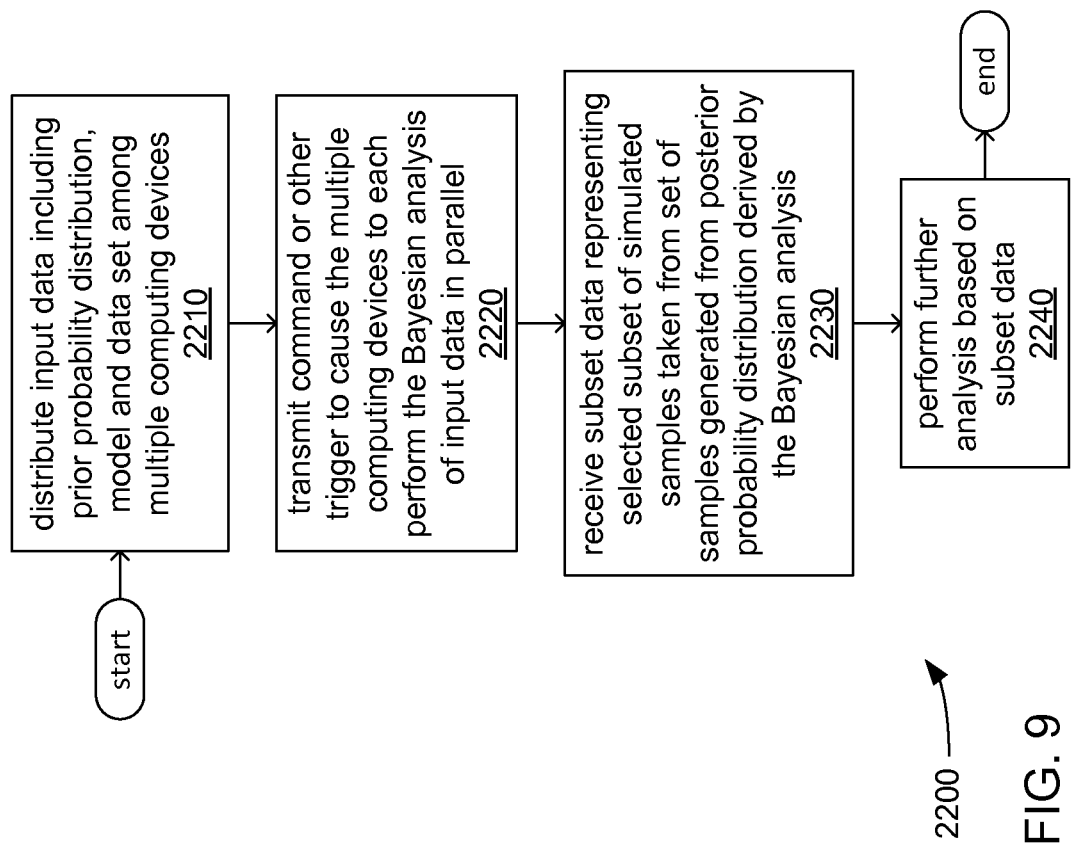
FIG. 9 illustrates an embodiment of a logic flow of supporting a performance of a Bayesian analysis and receiving a subset of simulated samples from a set of simulated samples generated from a posterior probability distribution derived by the Bayesian analysis.

FIG. 9 illustrates an embodiment of a logic flow 2200. The logic flow 2200 may be representative of some or all of the operations executed by one or more embodiments described herein. More specifically, the logic flow 2200 may illustrate operations performed by the processor component 150 in executing the control routine 140, and/or performed by other component(s) of at least the computing device 100 in triggering performance of a Bayesian analysis.

At 2210, a processor component of a computing device (e.g., the processor component 150 of the computing device 100) distributes input data representing a prior probability distribution, a model and a data set to multiple other computing devices (e.g., the input data 130 to the multiple computing devices 300*a-x*). At 2220, the computing device exchanges communications with one or more of the other computing devices (e.g., a command to begin performing a Bayesian analysis) to cause the other computing devices to each perform an instance of the same Bayesian analysis in parallel with the others.

At 2230, the computing device receives subset data representing a selected subset of the parameter values of the set of simulated samples generated from a posterior probability distribution derived by the Bayesian analysis performed by each of the multiple computing devices (e.g., the subset data 630 representing a subset of the simulated samples of the sample set data 330, which is derived from the posterior probability distribution represented by the output data 230). As previously explained, the parameter values making up the subset data are selected based on their inclusion in one or more draws of parameter values indicated as selected through use of their associated UPDFs. At 2240, the subset data is employed as an input to further analysis in lieu of the complete set of simulation samples.

Figure 10:
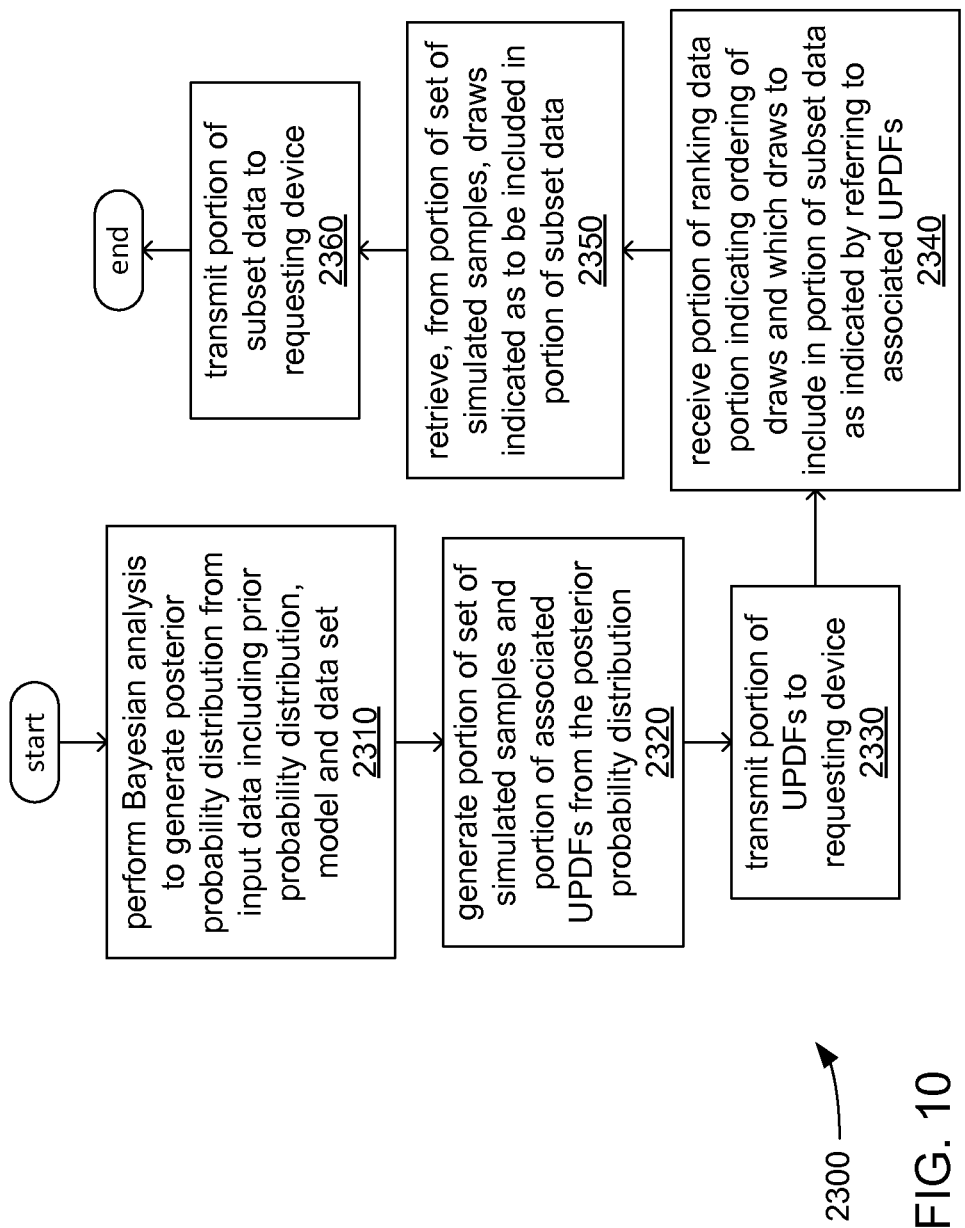
FIG. 10 illustrates an embodiment of a logic flow of generating a portion of a subset of a simulated sample from a portion of a set of simulated samples.

FIG. 10 illustrates an embodiment of a logic flow 2300. The logic flow 2300 may be representative of some or all of the operations executed by one or more embodiments described herein. More specifically, the logic flow 2300 may illustrate operations performed by the processor component 350 in executing the control routine 340, and/or performed by other component(s) of one of the computing devices 300*a-x* in generating the subset data 630 from the sample set data 330.

At 2310, a processor component of one of multiple computing devices (e.g., the processor component 350 of one of the multiple computing devices 300*a-x*) performs a Bayesian analysis on input data (e.g., the input data 130) to generate an output data that represents a posterior probability distribution (e.g., the output data 230). As previously discussed, the very same Bayesian analysis on the very same input data may be performed in parallel by multiple computing devices forming an array or "grid" of computing devices.

At 2320, the processor component of the one of the multiple computing devices generates a portion of a set of simulated samples made up of a chain of draws (e.g., one of the sample set portions 339*a-x* of the sample set data 330), and a portion of a set of UPDFs that correspond to those draws (e.g., the one of the UPDF portions 439*a-x* of the UPDF data 430) from the output data that the processor component earlier generated in performing the Bayesian analysis.

At 2330, the processor component transmits the portion of the set of UPDFs that the processor component generated to a requesting device (e.g., the requesting device 500).

At 2340, a portion of ranking data (e.g., one of the ranking portions 539*a-x* of the ranking data 530) is received by the one of the multiple computing devices from the requesting device to which the processor component of the one of the multiple computing devices earlier transmitted the portion of the set of UPDFs. This portion of ranking data includes an ordering of the draws in the portion of the set of simulated samples indicated by an ordering of associated UPDFs. This portion of ranking data also includes an indication of which of the draws are selected to be included in a portion of a subset data (e.g., a portion of the subset data 630), with such an indication again being made by identifying one or more UPDFs associated with selected draw(s).

At 2350, the processor component of the one of the multiple computing devices retrieves the selected draws from the portion of the set of simulated samples to generate the portion of the subset data. As previously discussed, this generation of portions of the subset data may also be performed in parallel by multiple computing devices.

At 2360, the processor component of the one of the multiple computing devices transmits the portion of the subset data to the requesting device.

Figure 11:
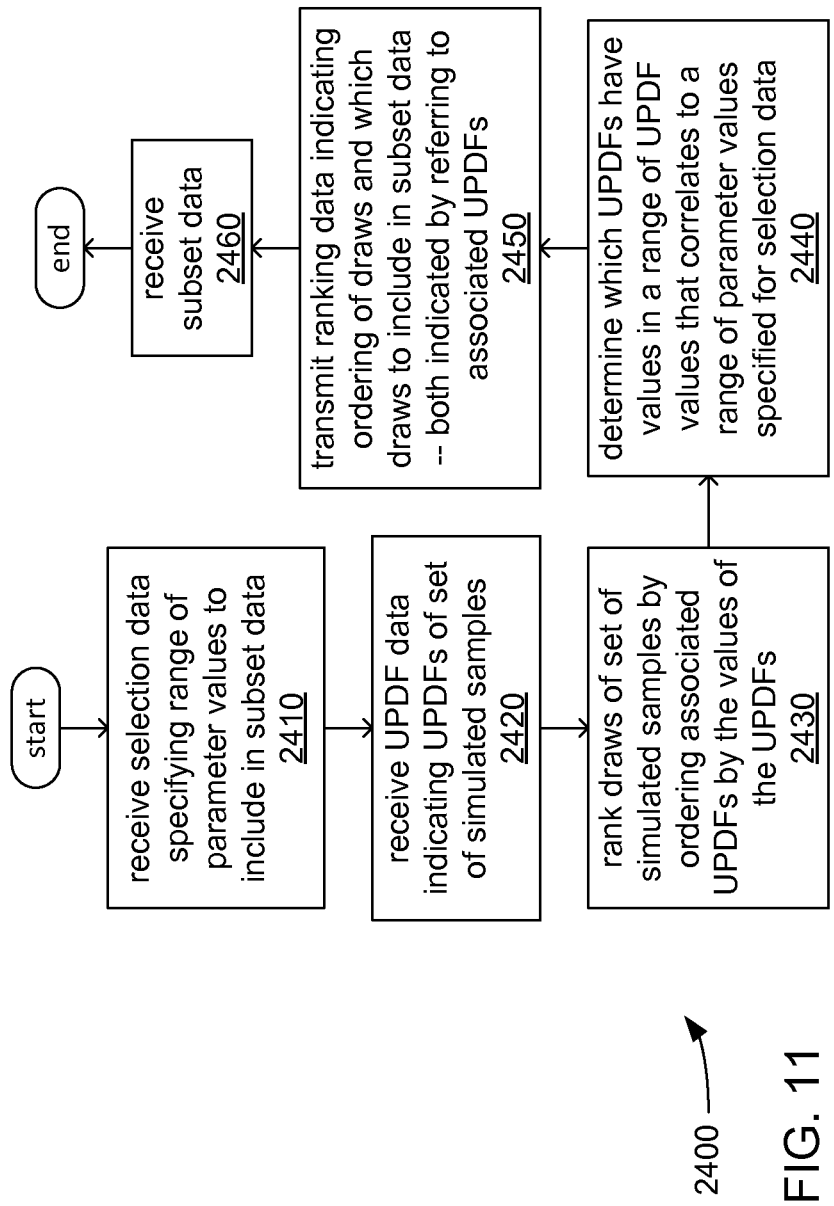
FIG. 11 illustrates an embodiment of a logic flow of requesting and combining portions of a subset of simulated samples.

FIG. 11 illustrates an embodiment of a logic flow 2400. The logic flow 2400 may be representative of some or all of the operations executed by one or more embodiments described herein. More specifically, the logic flow 2400 may illustrate operations performed by the processor component 550 in executing the control routine 540, and/or performed by other component(s) of at least the requesting device 500 in generating the subset data 630 from the sample set data 330.

At 2410, a requesting device (e.g., the requesting device 500) receives a selection data (e.g., the selection data 730) specifying a range of parameter values of parameters within a set of simulated samples (e.g., the set of simulated samples represented by the sample set data 330) to be included in a subset of the set of simulated samples (e.g., the subset represented by the subset data 630). The requesting device may receive the selection data from a viewing device (e.g., the viewing device 700). As previously discussed, the range of parameter values may be specified in any of a variety of ways within the selection data, including and not limited to, an indication of a range of percentiles, an indication of a mean or median, etc.

At 2420, the requesting, device also receives portions of UPDF data (e.g., the UPDF portions 439*a-x* of UPDF data 430) indicating UPDFs associated with draws of the set of simulated samples. The requesting device receives the portions of UPDF data from one or more of multiple computing devices that generate the portions of UPDF and the portions of the set of simulated samples (e.g., the computing devices 300*a-x*).

At 2430, having received (at the requesting device) the UPDF data indicating associations between UPDFs and draws of the set of simulated samples, a processor component of the requesting device (e.g., the processor component 550 of the requesting device 500) ranks the draws of the set of simulated samples by ordering the UPDFs by their values in an ascending or descending order. As previously discussed, by ordering the UPDFs by their values in such an order, the UPDFs become ranking values forming an index of their associated draws.

At 2440, the processor component of the requesting device determines which UPDFs have values in a range of UPDF values that correlates to a range of parameter values that are specified in the selection data for inclusion in the subset of simulated samples. The UPDFs having values that fall within that range of UPDF values become a subset of the UPDFs that are associated with draws of the set of simulated samples that include parameters having parameter values that may fall with within the range of parameter values specified in the selection data. Thus, by determining of which UPDFs fall into that subset of UPDFs, the processor component of the requesting device effectively selects what draws have parameters that have values that are to be included in the subset of the set of simulated samples (e.g., the subset data 630).

At 2450, the processor component of the requesting device transmits portions of ranking data (e.g., ranking portions 539*a-x*) to each of the multiple computing devices from which the requesting device earlier received the portions of UPDF data. Each of the portions of ranking data indicates an ordering of the draws stored by each of those computing devices, and does so by referring to their associated UPDFs. Each of the portions of the ranking data also indicates which of those draws are selected to be included in the subset of simulated samples, again doing so by referring to the draws by their associated UPDFs.

At 2460, the requesting device receives portions of the subset of the simulated samples (e.g., portions of the subset data 630) from the multiple computing devices to which the requesting device transmitted the portions of UPDF data. Each of these received portions of the subset of the simulated samples is made up of draws that are 1) present in the different portions of the set of simulated data generated by and stored within each of the multiple computing devices, and 2) selected for inclusion in the subset of simulated samples as a result of their association with UPDFs in the subset of UPDFs.

Figure 12:
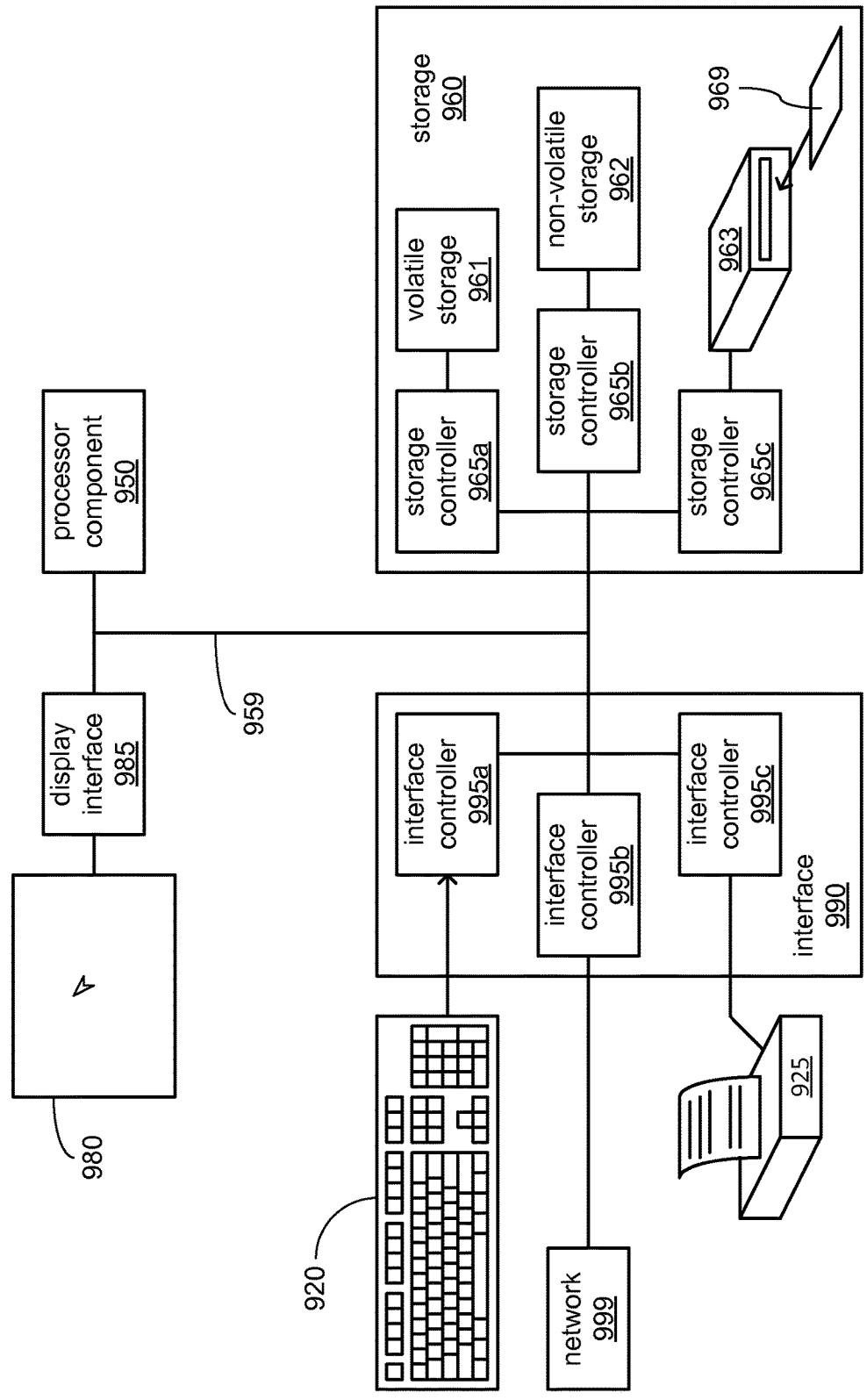
FIG. 12 illustrates an embodiment of a processing architecture.

FIG. 12 illustrates an embodiment of a processing architecture 3000 suitable for implementing various embodiments as previously described. More specifically, the processing architecture 3000 (or variants thereof) may be implemented as part of one or more of the computing devices 100, 300, 500 or 700. It should be noted that components of the processing architecture 3000 are given reference numbers in which the last two digits correspond to the last two digits of reference numbers of at least some of the components earlier depicted and described as part of the computing devices 100, 300, 500 and 700. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the unidirectional or bi-directional exchange of information. For instance, the components may communicate information over the communications media. The information can be implemented as transmissions allocated to one or more electrical and/or optical conductors. A message (including a command, status, address or data message) may be one of such transmissions or may be a plurality of such transmissions, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a touch screen 980 incorporating a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which commands and/or data are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 350 and 550) may include any of a wide variety of commercially available processors, employing any of a wide variety of technologies and implemented with one or more cores physically combined in any of a number of ways.

As previously discussed, the storage 960 (corresponding to the storages 160, 360, 560 and 760) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as including multiple distinct types of storage is in recognition of the commonplace use of more than one type of storage device in computing devices in which one type provides relatively rapid reading and writing capabilities enabling more rapid manipulation of data by the processor component 950 (but in which a "volatile" technology may be used constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (which may correspond to the interfaces 190, 390, 590 or 790) may employ any of a variety of communications technologies corresponding to any of a variety of communications technologies that may be employed to communicatively couple a computing device to one or more other devices. Again, one or both of various forms of wired or wireless communications may be employed to enable the processor component 950 to interact with input/output devices (e.g., the depicted example keyboard 920 or printer 925) and/or other computing devices, where such interaction may be through a network (e.g., the network 999) or an interconnected set of networks. In recognition of the often greatly different character of multiple types of timings and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data provided by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to the display 780), such a computing device implementing the processing architecture 3000 may also include the display interface 985. Although more generalized types of interface may be employed in communicatively coupling to a display (whether of the touch screen variety, or not), the somewhat specialized additional processing often required in visually displaying various forms of content on a display, as well as the somewhat specialized nature of the cabling-based interfaces used, often makes the provision of a distinct display interface desirable. Wired and/or wireless communications technologies that may be employed by the display interface 985 in a communicative coupling of the touch screen 980 may make use of timings and/or protocols that conform to any of a variety of industry standards, including without limitation, any of a variety of analog video interfaces, Digital Video Interface (DVI), DisplayPort, etc.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server, which can deliver statistical modeling and machine learning capabilities in a highly interactive programming environment that enables multiple users to concurrently manage data, transform variables, perform exploratory analysis, build and compare models and score with virtually no regards on the size of the data stored in Hadoop®. Some systems may use SAS In-Memory Statistics for Hadoop® to read big data once and analyze it several times by persisting it in-memory for the entire session.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-program product tangibly embodied in a non-transitory machine-readable storage medium, the computer-program product including, instructions operable to cause a computing device to perform operations including:
order a plurality of un-normalized probability density functions (PDFs) by an un-normalized PDF value of each un-normalized PDF, wherein the plurality of un-normalized PDFs provides an approximation of a chain of draws of a set of simulated samples that have been generated from and provide an approximate representation of a probability distribution, wherein each draw comprises multiple parameters, and wherein the un-normalized PDF values of the plurality of un-normalized PDFs proportionally map to parameter values of the multiple parameters of the draws within the chain of draws;
select a subset of the plurality of un-normalized PDFs based on the subset of the plurality of un-normalized PDFs having un-normalized PDF values that correspond to specified iso-probability surfaces which map to a subset of the parameter values that are to be included in a subset of the set of simulated samples; and
transmit to another computing device an indication of at least one draw within the chain of draws comprising parameters having parameter values to include in the subset of the set of simulated samples, wherein the indication identifies the at least one draw by referring, to at least one un-normalized PDF of the plurality of un-normalized PDFs associated with the at least one draw.

2. The computer-program product of claim 1, the computing device caused to perform operations including receive the un-normalized PDF values of the plurality of un-normalized PDFs from the other computing device, wherein the un-normalized PDF values are generated by the other computing device from at least a posterior probability distribution derived by the other computing device.

3. The computer-program product of claim 1, wherein:
the other computing device is one of a plurality of computing devices operated in parallel to each generate a portion of the chain and a portion of the plurality of un-normalized PDFs from a posterior probability distribution; and the computing device is caused to perform operations including:
receive a portion of the plurality of un-normalized PDFs from each computing device of the plurality of computing devices; and
transmit at least a portion of the indication of at least one draw of the chain to each computing device of the plurality of computing devices.

4. The computer-program product of claim 3, the computing device caused to perform operations including:
receive parameter values of a draw of the chain from each computing device of the plurality of computing devices; and
generate the subset of the set of simulated samples from the parameter values.

5. The computer-program product of claim the computing device caused to perform operations including:
generate a portion of the chain and a portion of the plurality of un-normalized PDFs from a posterior probability distribution derived by a Bayesian analysis; and
select parameter values of parameters of a draw of the portion of the chain to include in the subset of the set of simulated samples based on an association of the draw with an un-normalized PDF of the subset of the plurality of un-normalized PDFs.

6. A computer-implemented method comprising:
ordering, on a computing device, a plurality of un-normalized probability density functions (PDFs) by an un-normalized PDF value of each un-normalized PDF, wherein the plurality of un-normalized PDFs provides an approximation of a chain of draws of a set of simulated samples that have been generated from and provide an approximate representation of a probability distribution, wherein each draw comprises multiple parameters, and wherein the un-normalized PDF values of the plurality of un-normalized PDFs proportionally map to multivariate parameter values of the multiple parameters of the draws within the chain of draws;
selecting, on the computing device, a subset of the plurality of un-normalized PDFs based on the subset of the plurality of un-normalized PDFs having un-normalized PDF values that correspond to specified iso-probability surfaces which map to a subset of the parameter values that are to be included in a subset of the set of simulated samples; and
transmitting, from the computing device, to another computing device an indication of at least one draw within the chain of draws comprising parameters having parameter values to include in the subset of the set of simulated samples, wherein the indication identifies the at least one draw by referring to at least one un-normalized PDF of the plurality of un-normalized PDFs associated with the at least one draw.

7. The computer-implemented method of claim 6, comprising receiving, at the computing device, the un-normalized PDF values of the plurality of un-normalized PDFs from the other computing device, wherein the un-normalized PDF values are generated by the other computing device from at least a posterior probability distribution derived by the other computing device.

8. The computer-implemented method of claim 6, wherein:
the other computing device is one of a plurality of computing devices operated in parallel to each generate a portion of the chain and a portion of the plurality of un-normalized PDFs from a posterior probability distribution; and
the method comprises:
receiving, at the computing device, a portion of the plurality of un-normalized PDFs from each computing device of the plurality of computing devices; and
transmitting, from the computing device, at least a portion of the indication of at least one draw of the chain to each computing device of the plurality of computing devices.

9. The computer-implemented method of claim 8, comprising:
receiving, at the computing device, parameter values of a draw of the chain from each computing device of the plurality of computing devices; and
generating, on the computing device, the subset of the set of simulated samples from the parameter values.

10. The computer-implemented method of claim 6, comprising:
generating, on the computing device, a portion of the chain and a portion of the plurality of un-normalized PDFs from a posterior probability distribution derived by a Bayesian analysis; and
selecting, on the computing device, parameter values of parameters of a draw of the portion of the chain to include in the subset of the set of simulated samples based on an association of the draw with an un-normalized PDF of the subset of the plurality of un-normalized PDFs.

11. A computer-program product tangibly embodied in a non-transitory machine-readable storage medium, the computer-program product including instructions operable to cause a computing device to perform operations including:
generate a portion of a set of simulated samples from a posterior probability distribution, wherein the set of simulated samples comprises a chain of draws of parameters that provides an approximate representation of the posterior probability distribution;
generate a portion of a set of un-normalized probability density functions (PDFs), wherein each un-normalized PDF of the set of un-normalized PDFs is associated with one of the draws of the chain of draws, wherein the set of un-normalized PDFs provides an approximation of the chain of draws, and wherein un-normalized PDF values of the set of un-normalized PDFs proportionally map to parameter values of the parameters of the draws within the chain of draws;
transmit the portion of the set of un-normalized PDFs to a requesting device;
select at least one draw of the chain to include in a subset of the set of simulated samples based on an indication from the requesting device of the at least one chain as included in the subset, wherein the indication specifies the at least one draw by at least one un-normalized PDF of the set of un-normalized PDFs, and wherein the at least one un-normalized PDF is associated with the at least one draw; and
transmit parameter values of the at least one draw to the requesting device based on the indication.

12. The computer-program product of claim 11, the computing device caused to perform operations including receive the indication of the at least one chain as included in the subset from the requesting device.

13. The computer-program product of claim 12, the computing device caused to perform operations including:
coordinate with another computing device to derive the posterior probability distribution in parallel with the other computing device deriving the posterior probability distribution;

generate the portion of the set of simulated samples in parallel with the other computing device generating another portion of the set of simulated samples; and generate the portion of the set of un-normalized PDFs in parallel with the other computing device generating another portion of the set of un-normalized PDFs.

14. The computer-program product of claim 13, the computing device caused to perform operations including coordinate with the other computing device to perform a Bayesian analysis to derive the posterior probability distribution from at least a prior probability distribution in parallel with the other computing device performing the Bayesian analysis to derive the posterior probability distribution from at least the prior probability distribution.

15. The computer-program product of claim 14, the computing device caused to perform operations including distribute at least the prior probability distribution to at least the other computing device.

16. The computer-program product of claim 11, the computing device caused to perform operations including:
   receive at least one other draw of the chain from the other computing device, wherein the at least one other draw is selected to include in the subset based on another indication of the at least one other chain as included in the subset, wherein the other indication specifies the at least one other draw by at least one other un-normalized PDF of the set of un-normalized PDFs, and wherein the at least one other un-normalized PDF is associated with the at least one other draw; and
   combine parameters values of the at least one draw with parameter values of the at least one other draw, wherein transmitting the parameter values of the at least one draw to the requesting device comprises transmitting the parameters of the at least one other draw to the requesting device.

17. A computer-implemented method comprising:
   generating, at a computing device, a portion of a set of simulated samples from a posterior probability distribution, wherein the set of simulated samples comprises a chain of draws of parameters that provides an approximate representation of the posterior probability distribution;
   generating, at the computing device, a portion of a set of un-normalized probability density functions (PDFs), wherein each un-normalized PDF of the set of un-normalized PDFs is associated with one of the draws of the chain of draws, wherein the set of un-normalized PDFs provides an approximation of the chain of draws, and wherein un-normalized PDF values of the set of un-normalized PDFs proportionally map to parameter values of the parameters of the draws within the chain of draws;
   transmitting, from the computing device, the portion of the set of un-normalized PDFs to a requesting device;
   selecting, at the computing device, at least one draw of the chain to include in a subset of the set of simulated samples based on an indication from the requesting device of the at least one chain as included in the subset, wherein the indication specifies the at least one draw by at least one un-normalized PDF of the set of un-normalized PDFs, and wherein the at least one un-normalized PDF is associated with the at least one draw; and
   transmitting, from the computing device, parameter values of the at least one draw to the requesting device based on the indication.

18. The computer-implemented method of claim 17, comprising receiving, at the computing device, the indication of the at least one chain as included in the subset from the requesting device.

19. The computer-implemented method of claim 18, comprising:
   coordinating with another computing device to derive the posterior probability distribution in parallel with the other computing device deriving the posterior probability distribution;
   generating, at the computing device, the portion of the set of simulated samples in parallel with the other computing device generating another portion of the set of simulated samples; and
   generating, at the computing device, the portion of the set of un-normalized PDFs in parallel with the other computing device generating another portion of the set of un-normalized PDFs.

20. The computer-implemented method of claim 19, comprising coordinating with the other computing device to perform of a Bayesian analysis to derive the posterior probability distribution from at least a prior probability distribution in parallel with the other computing device performing the Bayesian analysis to derive the posterior probability distribution from at least the prior probability distribution.

21. The computer-implemented method of claim 20, comprising distributing, from the computing device, at least the prior probability distribution to at least the other computing device.

22. The computer-implemented method of claim 17, comprising:
   receiving, at the computing device, at least one other draw of the chain from the other computing device, wherein the at least one other draw is selected to include in the subset based on another indication of the at least one other chain as included in the subset, wherein the other indication specifies the at least one other draw by at least one other un-normalized PDF of the set of un-normalized PDFs, and wherein the at least one other un-normalized PE is associated with the at least one other draw; and
   combining, at the computing device, parameters values of the at least one draw with parameter values of the at least one other draw, wherein transmitting the parameter values of the at least one draw to the requesting device comprises transmitting the parameters of the at least one other draw to the requesting device.

23. An apparatus comprising a processor and a storage to store instructions that, when executed by the processor, cause the processor to perform operations comprising:
   order a plurality of un-normalized probability density functions (PDFs) by an un-normalized PDF value of each un-normalized PDF, wherein the plurality of un-normalized PDFs provides an approximation of a chain of draws of a set of simulated samples that have been generated from and provide an approximate representation of a probability distribution, wherein each draw comprises multiple parameters, and wherein the un-normalized PDF values of the plurality of un-normalized PDFs proportionally map to multivariate parameter values of the multiple parameters of the draws within the chain of draws;
   select a subset of the plurality of un-normalized PDFs based on the subset of the plurality of un-normalized PDFs having un-normalized PDF values that correspond to specified iso-probability surfaces which map to a subset of the parameter values that are to be included in a subset of the set of simulated samples; and
transmit to a computing device an indication of at least one draw within the chain of draws comprising parameters having parameter values to include in the subset of the set of simulated samples, wherein the indication identifies the at least one draw by referring to at least one un-normalized PDF of the plurality of un-normalized PDFs associated with the at least one draw.

24. The apparatus of claim 23, wherein the processor is caused to receive the un-normalized PDF values of the plurality of un-normalized PDFs from the computing device, wherein the un-normalized PDF values are generated by the computing device from at least a posterior probability distribution derived by the computing device.

25. The apparatus of claim 23, wherein:
the computing device is one of a plurality of computing devices operated in parallel to each generate a portion of the chain and a portion of the plurality of un-normalized PDFs from a posterior probability distribution; and
the processor is caused to perform operations comprising:
receive a portion of the plurality of un-normalized PDFs from each computing device of the plurality of computing devices; and
transmit at least a portion of the indication of at least one draw of the chain to each computing device of the plurality of computing devices.

26. The apparatus of claim 25, wherein the processor is caused to perform operations comprising:
receive parameter values of a draw of the chain from each computing device of the plurality of computing devices; and
generate the subset of the set of simulated samples from the parameter values.

27. The apparatus of claim 23, wherein the processor is caused to perform operations comprising:
generate a portion of the chain and a portion of the plurality of un-normalized PDFs from a posterior probability distribution derived by a Bayesian analysis; and
select parameter values of parameters of a draw of the portion of the chain to include in the subset of the set of simulated samples based on an association of the draw with an un-normalized PDF of the subset of the plurality of un-normalized PDFs.

28. The apparatus of claim 23, wherein the processor is caused to transmit the subset of the set of simulated samples to a viewing device.

* * * * *

UNITED STATES PATENT AND TRADEMARK OFFICE
CERTIFICATE OF CORRECTION

PATENT NO. : 9,672,193 B2
APPLICATION NO. : 14/217707
DATED : March 18, 2014
INVENTOR(S) : Christian Macaro, Jan Chvosta and Mark Roland Little It is certified that error appears in the above-identified patent and that said Letters Patent is hereby corrected as shown below:

In the Specification

Column 5, Line 6, replace "ma" with -- may --.

Signed and Sealed this
Seventh Day of November, 2017

Joseph Matal
*Performing the Functions and Duties of the
Under Secretary of Commerce for Intellectual Property and
Director of the United States Patent and Trademark Office*